(12) United States Patent
Enomura

(10) Patent No.: US 10,166,605 B2
(45) Date of Patent: Jan. 1, 2019

(54) METHOD FOR PRODUCING MICROPARTICLES

(75) Inventor: Masakazu Enomura, Izumi (JP)

(73) Assignee: M. TECHNIQUE CO., LTD., Izumi-Shi, Osaka (JP)

( * ) Notice: Subject to any disclaimer, the term of this patent is extended or adjusted under 35 U.S.C. 154(b) by 340 days.

(21) Appl. No.: 14/398,156

(22) PCT Filed: May 1, 2012

(86) PCT No.: PCT/JP2012/061579
§ 371 (c)(1),
(2), (4) Date: Oct. 31, 2014

(87) PCT Pub. No.: WO2013/164886
PCT Pub. Date: Nov. 7, 2013

(65) Prior Publication Data
US 2015/0114179 A1    Apr. 30, 2015

(51) Int. Cl.
| | |
|---|---|
| *B22F 9/24* | (2006.01) |
| *C08F 20/06* | (2006.01) |
| *B22F 9/08* | (2006.01) |
| *B29B 9/12* | (2006.01) |
| *C03B 19/10* | (2006.01) |

(Continued)

(52) U.S. Cl.
CPC ............... *B22F 9/24* (2013.01); *B01J 14/00* (2013.01); *B01J 19/1887* (2013.01); *B22F 9/082* (2013.01); *B29B 9/12* (2013.01); *C03B 19/10* (2013.01); *B01J 2219/00189* (2013.01); *B01J 2219/00245* (2013.01); *B22F 2009/084* (2013.01); *B22F 2009/0884* (2013.01); *B22F 2009/0892* (2013.01); *B22F 2999/00* (2013.01);

(Continued)

(58) Field of Classification Search
None
See application file for complete search history.

(56) References Cited

U.S. PATENT DOCUMENTS

| | | |
|---|---|---|
| 2005/0272890 A1 | 12/2005 | Konishi et al. |
| 2010/0155310 A1 | 6/2010 | Enomura |

(Continued)

FOREIGN PATENT DOCUMENTS

| | | |
|---|---|---|
| CN | 101784258 A | 7/2010 |
| CN | 101784338 A | 7/2010 |

(Continued)

*Primary Examiner* — George Wyszomierski
(74) *Attorney, Agent, or Firm* — Birch, Stewart, Kolasch & Birch, LLP

(57) ABSTRACT

The problem addressed by the present invention is providing a method for producing microparticles. At least two fluids to be processed, a raw material fluid that contains a raw material and a processing fluid that contains a substance for processing the raw material are mixed in a thin film fluid formed between at least two surfaces for processing that are disposed so as to face each other, that can approach and separate from each other and at least one of which rotates relative to the other, and microparticles of the raw material that is processed are obtained. At this time, the proportion of the microparticles of the raw material which has been processed that coalesces with each other is controlled by controlling the circumferential speed of the rotation in a confluence section in which the raw material fluid and processing fluid flow together.

11 Claims, 10 Drawing Sheets

(51) Int. Cl.
*B01J 14/00* (2006.01)
*B01J 19/18* (2006.01)
*B29K 31/00* (2006.01)

(52) U.S. Cl.
CPC ..... *B29B 2009/125* (2013.01); *B29K 2031/04* (2013.01)

(56) References Cited

U.S. PATENT DOCUMENTS

| | | |
|---|---|---|
| 2010/0196788 A1 | 8/2010 | Enomura |
| 2010/0243947 A1* | 9/2010 | Enomura ............. B01D 9/0054 252/62.55 |
| 2010/0322997 A1 | 12/2010 | Enomura |
| 2010/0327236 A1 | 12/2010 | Enomura |

FOREIGN PATENT DOCUMENTS

| | | |
|---|---|---|
| EP | 1602670 A1 | 12/2005 |
| EP | 2177294 A1 | 4/2010 |
| EP | 2184109 A1 | 5/2010 |
| JP | 2006-69880 A | 3/2006 |
| JP | 2006-184306 A | 7/2006 |
| JP | 2006-341232 A | 12/2006 |
| JP | 2009-131831 A | 1/2009 |
| JP | 2009-82902 A | 4/2009 |
| WO | WO 2009/008390 A1 | 1/2009 |
| WO | WO 2009/008393 A1 | 1/2009 |

* cited by examiner (A)

(B)

METHOD FOR PRODUCING MICROPARTICLES

The present invention relates to a method for producing microparticles.

In recent years, microparticles are widely used in various industrial fields such as an optical material, a magnetic material, a conductive material, an electronic material, a functional ceramics, a fluorescent material, a catalytic material, and a chemical material. For example, microparticles of a metal, of a metal oxide, and of a composite material are expected to become a material having drastically improved optical, electromagnetic, and mechanical properties. In addition, there is a particularly large expectation for new properties including expression of superfunctional properties and novel properties owing to a quantum size effect that is brought about by making particles to microparticles. However, because these properties are closely related to the particle diameter thereof, not only synthesis of microparticles but also precise control of particle diameters of these microparticles is wanted. Primarily, properties of microparticles change depending on the particle diameter of the primary particle thereof; however, in the case that plural primary particles are agglomerated, especially in the case that primary particles coalesce with each other, the properties thereof are different from those of microparticles that are not coalesced.

Illustrative example of the major method for manufacturing microparticles includes a so-called brake-down method in which particles are crushed by using a bead mill or the like, a build-up method with a gas-phase method such as CVD or PVD, and a build-up method with a liquid-phase method using an equipment such as a microreactor. However, in the break-down method, even though it requires a large energy, it is still difficult to obtain fine particles in a nanometer size; and on top of it, a strong force is applied to microparticles in the crashing process, and thus, in practice there have been problems including not expressing the expected properties as the microparticles. In the gas-phase method and the method using an equipment such as a microreactor, there have been problems including a high energy cost; and on top of it, it has been difficult to manufacture microparticles stably and in mass production thereof. In addition, in the liquid-phase method, especially in the case of a batch process, it has been difficult to obtain uniform particle diameter of the produced microparticles, so that there have been problems including generation of coarse particles and deterioration of properties of the microparticles caused by classification to remove the coarse particles thus produced. Accordingly, by the existing manufacturing methods of microparticles, industrially it has been very difficult to control the particle diameter of microparticles.

The coarse particles mentioned above are generated by coalescence of microparticles by themselves, eventually resulting in a wide particle diameter distribution in the obtained microparticles. Accordingly, in order to prevent agglomeration and coalescence of microparticles by themselves from occurring, a countermeasure is employed to secure dispersibility of the microparticles by such methods as use of a dispersant and introduction of a modification group on surface of the microparticles when producing thereof.

On the other hand, by preventing agglomeration and coalescence of microparticles by themselves from occurring, the particle diameter of microparticles to be obtained can be controlled. For example, in Patent Document 1, it is described that in the method for producing electrophotographic toners, by adding an acrylate polymer salt to the system thereof as a dispersant, coagulation state of the primary particles including a resin binder can be controlled, whereby the particle diameter and the particle diameter distribution of the coalescent particles can be readily controlled.

In addition, methods for producing microparticles shown in Patent Documents 2 and 3 were provided by Applicant of the present invention; however, there was no disclosure specifically with regard to control of agglomeration and coalescence of microparticles by themselves.

PRIOR ART DOCUMENTS

Patent Document

Patent Document 1: Japanese patent Laid-Open Publication No. 2006-184306
Patent Document 2: International Patent Laid-Open Publication No. WO 2009/008393
Patent Document 3: International Patent Laid-Open Publication No. WO 2009/008390

In view of the situation mentioned above, the problem to be solved by the present invention is to provide a method for producing microparticles wherein coalescence of microparticles by themselves, especially the rate of coalescence of microparticles by themselves is controlled with the said method.

Means for Solving the Problems

Applicant of the present invention found that during the time when at least two fluids to be processed comprising a raw material fluid which contains a raw material and a processing fluid which contains a substance to process the raw material are mixed in a thin film fluid formed between at least two processing surfaces which are disposed in a position they are faced with each other so as to be able to approach to and separate from each other, at least one of which rotates relative to the other whereby obtaining microparticles of the processed raw material, by controlling circumferential velocity of the rotation at a converging site in which the at least two fluids to be processed are converged (conversing site), rate of coalescence of the microparticles by themselves could be controlled; and based on this finding, the present invention could be accomplished.

Provided by the present invention is a method for producing microparticles, in which
at least two fluids to be processed are used,
of them at least one fluid to be processed is a raw material fluid which contains at least one raw material,
at least one fluid to be processed other than the foregoing fluid to be processed is a processing fluid which contains at least one substance to process the raw material, and
the fluids to be processed are mixed in a thin film fluid formed between at least two processing surfaces which are disposed in a position they are faced with each other so as to be able to approach to and separate from each other, at least one of which rotates relative to the other whereby obtaining microparticles of the processed raw material, wherein
by controlling circumferential velocity of the rotation at a converging site in which the raw material fluid and the processing fluid are converged, rate of coalescence of the microparticles by themselves is controlled.

In the present application, coalescence of microparticles by themselves means that, for example, in the case that form of the microparticles is a ball, plural balls are bound with each other while maintaining part of the form of each ball, whereby it can be judged from the appearance thereof that plural microparticles are stuck together, regardless whether this coalescence takes place during growing process of the microparticles or after growth thereof.

Measurement of the particle diameter of the microparticles was made by considering the microparticles stuck together as one microparticle as well.

In addition, in the present invention, the process may be executed as at least one process selected from the group consisting of separation, emulsification, dispersion, reaction, and coagulation.

The present invention may also be executed as an embodiment, wherein any one of the fluids to be processed, the raw material fluid and the processing fluid, passes through between the processing surfaces while forming the thin film, a separate introduction path independent of the flow path through which the at least any one of the fluids to be processed is passed is arranged, at least one opening leading to the separate introduction path is arranged in at least anyone of the at least two processing surfaces, and of the raw material fluid and the processing fluid, any other one of the any one of the fluids to be processed is introduced into between the at least two processing surfaces from the opening, whereby the raw material fluid and the processing fluid are mixed in the thin film fluid.

In addition, it is preferable that the present invention be executed by controlling the circumferential velocity of the rotation in the range of 0.8 to 41.9 m/sec at the converging site in which the raw material fluid and the processing fluid are converged.

Further, the present invention is executed in such a way that the rate of coalescence of the microparticles by themselves may be preferably 50% or less, more preferably 40% or less, or still more preferably 30% or less, by controlling the circumferential velocity of the rotation at the converging site in which the raw material fluid and the processing fluid are converged.

According to mere one embodiment of the present invention, the present invention may be carried out as a method for producing a microparticle, wherein the method comprises:

a fluid pressure imparting mechanism for imparting a pressure to a fluid to be processed, a first processing member provided with a first processing surface of the at least two processing surfaces, a second processing member provided with a second processing surface of the at least two processing surfaces, and a rotation drive mechanism for rotating these processing members relative to each other; wherein each of the processing surfaces constitutes part of a sealed flow path through which the fluid to be processed under the pressure is passed, of the first and the second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms a thin film fluid, in this thin film fluid, whereby obtaining a processed raw material microparticle as a producing method.

According to the present invention, it became possible not only to control the rate of coalescence of the microparticles by themselves and but also to produce the microparticles conveniently and continuously, these having been difficult to be realized by conventional methods. In addition, by simple alteration of process condition, namely by changing the circumferential velocity of the rotation at the converging site of at least two fluids to be processed in between the at least two processing surfaces which are disposed in a position they are faced with each other so as to be able to approach to and separate from each other, at least one of which rotates relative to the other, the rate of coalescence of the microparticles by themselves can be controlled; and thus, it became possible to produce microparticles selectively in accordance with the intended purpose with a lower cost and a lower energy than ever, and in addition, the said microparticles can be provided cheaply and stably. Besides, not only without using the afore-mentioned dispersant but also with using the afore-mentioned dispersant, the rate of coalescence of the microparticles by themselves can be controlled by controlling the circumferential velocity of the rotation at the converging site in which the at least two fluids to be processed are converged in between the at least two processing surfaces.

Figure 1:
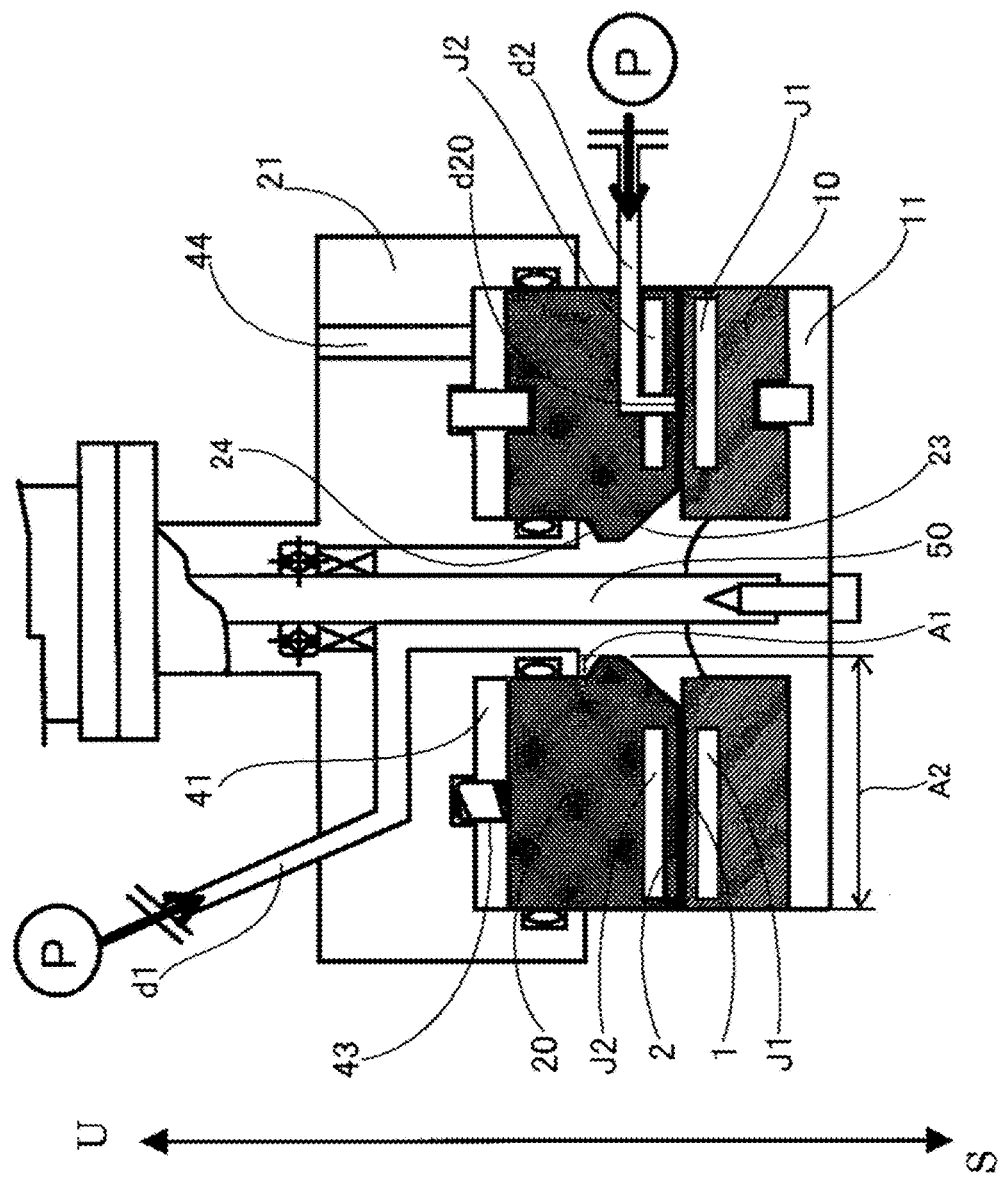
FIG. 1 is a schematic sectional view showing the fluid processing apparatus according to an embodiment of the present invention.

Hereunder, one embodiment of the present invention will be specifically explained.

Raw Material Fluid:

The raw material fluid in the present invention contains at least one raw material; and it is preferable that the raw material be mixed with or dissolved in a solvent mentioned later (hereinafter, mixing or dissolving is expressed merely by dissolution).

The raw material in the present invention is not particularly restricted, while illustrative example thereof includes an organic substance, an inorganic substance, an organic-inorganic composite material, and the like; such as a single body of a metal element and of a non-metal element, a compound of these elements, and the like. Illustrative example of the said compound includes a salt, an oxide, a hydroxide, a hydroxylated oxide, a nitride, a carbide, a complex, an organic compound, a hydrate of these substances, and an organic solvent adduct of these substances. These may be a single substance to be separated or may be a mixture of two or more of them.

Meanwhile, the raw material that is used as the starting raw material and the raw material that is obtained by the mixing process thereof with the processing fluid may be the same or different with each other before and after the process. For example, in the case of a metal, it may be allowed the case that the raw material used as the starting raw material is a metal compound and the raw material after the process is a metal singe body that constitutes the metal compound. Furthermore, it may be allowed the case that the raw material used as the starting raw material is a mixture of plural metal compounds and the raw material after the process is a reaction product produced by a reaction of plural metal compounds which are the raw material used as the starting raw material with the substance contained in the processing fluid to process the raw material. It may also be allowed the case that the raw material used as the starting raw material is a metal single body and the raw material after the process is the same metal single body.

Processing Fluid:

The processing fluid of the present invention contains at least one substance to process the raw material. The process mentioned here is not particularly restricted, however, illustrative example thereof includes separation, emulsification, dispersion, reaction, and coagulation. The processing fluid may be later-mentioned solvents used singly or a fluid having, as the substance to process the afore-mentioned raw material, the following substances in a solvent. The said substance is not particularly restricted, while illustrative example thereof includes inorganic or organic acidic substances such as hydrochloric acid, sulfuric acid, nitric acid, aqua regia, trichioroacetic acid, trifluoroacetic acid, phosphoric acid, citric acid, and ascorbic acid; basic substances such as alkaline hydroxides including sodium hydroxide and potassium hydroxide, and amines including triethylamine and dimethylamino ethanol; and salts of these acidic substances and basic substances. In addition, a reducing agent that can reduce the afore-mentioned raw materials, for example, a reducing agent capable of reducing a metal and/or a metal compound, preferably a metal ion may be mentioned. The reducing agent is not particularly restricted; though a substance capable of reducing a metal ion is preferable. Illustrative example thereof includes hydrazine, hydrazine monohydrate, formaldehyde, sodium sulfoxylate, a boron hydride metal salt, an aluminum hydride metal salt, a triethylboron hydride metal salt, glucose, citric acid, ascorbic acid, tannic acid, dimethylformamide, pyrogallol, tetrabutylammonium borohydride, sodium hypophosphite ($NaH_2PO_2.H_2O$), Rongalite C ($NaHSO_2.CH_2O.2H_2O$), and a metal compound or an ion thereof, preferably a transition metal or an ion thereof, such as iron and titanium. The foregoing reducing agents include those in the form of a hydrate, an organic solvent adduct, and an anhydrous compound thereof. These substances to process a raw material may be used singly or as a mixture of two or more of them. Meanwhile, in the case when the solvent shown above is used singly as processing fluid, this solvent becomes the substance to process the raw material.

Solvents:

The solvent to be used for a raw material fluid and processing fluid in the present invention is not particularly restricted; and illustrative example thereof includes water such as an ion-exchanged water, a RO water, a pure water, and a ultrapure water; alcoholic organic solvents such as methanol and ethanol; polyol organic solvents (polyvalent alcohols) such as ethylene glycol, propylene glycol, trimethylene glycol, triethylene glycol, polyethylene glycol, and glycerin; ketonic organic solvents such as acetone and methyl ethyl ketone; ester organic solvents such as ethyl acetate and butyl acetate; ether organic solvents such as dimethyl ether and dibutyl ether; aromatic organic solvents such as benzene, toluene, and xylene; and aliphatic hydrocarbon organic solvents such as hexane and pentane. If the foregoing alcoholic organic solvents or polyol organic solvents are used as the solvent, there is a merit that these solvents can act also as the reducing agent. These solvents each may be used singly or as a mixture of two or more of them. Especially, as to the processing fluid, the above-mentioned solvent may be used solely as the processing fluid, as mentioned above. In other words, the above-mentioned solvent may become the substance to process the raw material even as it is used solely.

The raw material fluid and/or the processing fluid in the present invention may be used even if these include the state of solid and crystal such as a dispersion solution and a slurry of them.

Hereunder, specific embodiments of the present invention will be explained by taking a method for producing a metal microparticle as the example thereof. However, the present invention is not limited to the method for producing a metal microparticle.

Metal Fluids and Metals:

The metal fluid in the present invention is the fluid in which any one of a metal and a metal compound or both are dissolved as a raw material in a solvent thereby being a raw material fluid.

Metals in the present invention are not particularly restricted. Preferably, all metal elements in the periodical table may be used. Illustrative example of the metal element includes Ti, Fe, W, Pt, Au, Cu, Ag, Pb, Ni, Mn, Co, Ru, V, Zn, Zr, Sn, Ta, Nb, Hf, Cr, Mo, Re, In, Ir, Os, Y, Tc, Pd, Rh, Sc, Ga, Al, Bi, Na, Mg, Ca, Ba, La, Ce, Nd, Ho, and Eu. In addition to these metal elements, non-metal elements as the metal elements of B, Si, Ge, As, Sb, C, N, O, S, Te, Se, F, Cl, Br, I, and At may be used in the present invention. These metals may be constituted of a single element; or an alloy formed of a plurality of metal elements or a substance which contains a metal element and a non-metal element may be used. Naturally, an alloy formed of a precious metal and a non-precious metal may be used.

Metal Compounds:

A metal solution in which a metal compound of these metals, in addition to a single element of the foregoing metals (including non-metal elements mentioned above), is dissolved in the solvent may be used as the metal fluid. The metal compound of the present invention is not particularly restricted; and illustrative example thereof includes metal compounds in the form of a metal salt, an oxide, a hydroxide, a hydroxylated oxide, a nitride, a carbide, a complex, an organic salt, an organic complex, an organic compound, and a hydrate and an organic solvent adduct of them. The metal salt is not particularly restricted; and illustrative example thereof includes a nitrate, a nitrite, a sulfate, a sulfite, a formate, an acetate, a phosphate, a phosphite, a hypophosphite, a chloride, an oxysalt, an acetylacetonato salt, and a hydrate or an organic solvent adduct of these metal salts. Illustrative example of the organic compound includes a metal alkoxide. These metal compounds may be used singly or as a mixture of two or more of them.

Reducing Agent Fluid and Reducing Agent:

As to the reducing agent fluid used in the present invention, at least one reducing agent mentioned above is contained therein, whereby the resulting fluid becomes the processing fluid. These reducing agents each may be used solely or as a mixture in which two or more of them are mixed. As the reducing agent fluid, it is preferable to use the fluid in which the above-mentioned reducing agent is mixed with or dissolved in the solvent.

The metal fluid and/or the reducing fluid may be used even if these include the state of solid and crystal such as a dispersion solution and a slurry of them.

Fluid Processing Apparatus:

The present invention is preferably executed by a method in which uniform mixing and stirring of a raw material fluid with a processing fluid are done in a thin film fluid formed between processing surfaces which are disposed in a position they are faced with each other so as to be able to approach to and separate from each other, at least one of which rotates relative to the other; and thus, for example, it is preferable to use an apparatus based on the same principle as the apparatus shown in Patent Document 2 and 3 filed by the present applicant, by mixing in the way as mentioned above, thereby obtaining processed raw material microparticle.

Hereinafter, embodiments of the above-mentioned fluid processing apparatus will be explained by using the drawings.

Figure 2:
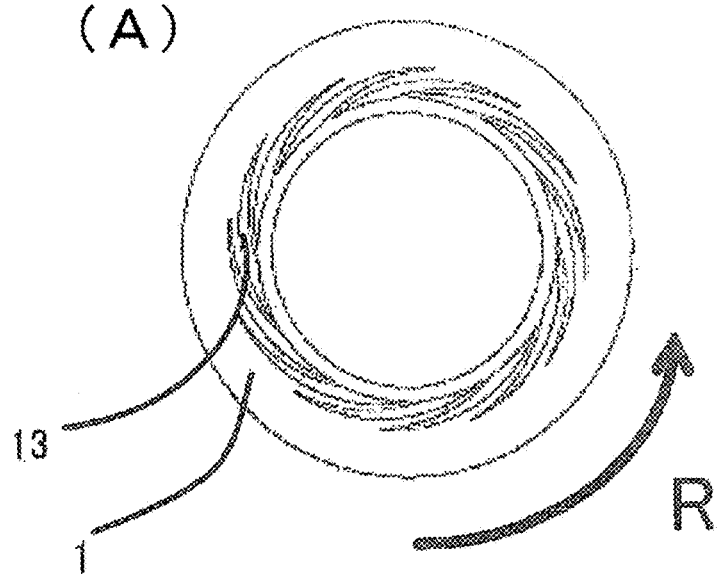
FIG. 2(A) is a schematic plane view of the first processing surface in the fluid processing apparatus shown in FIG. 1, and FIG. 2 (B) is an enlarged view showing an important part of the processing surface in the apparatus.
Figure 2:
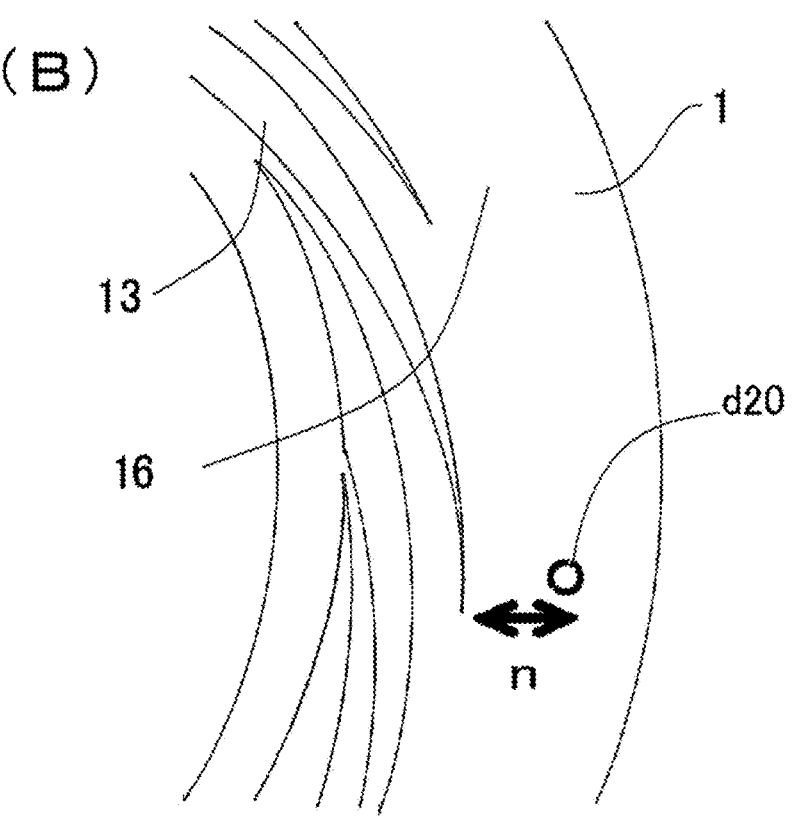
Figure 3:
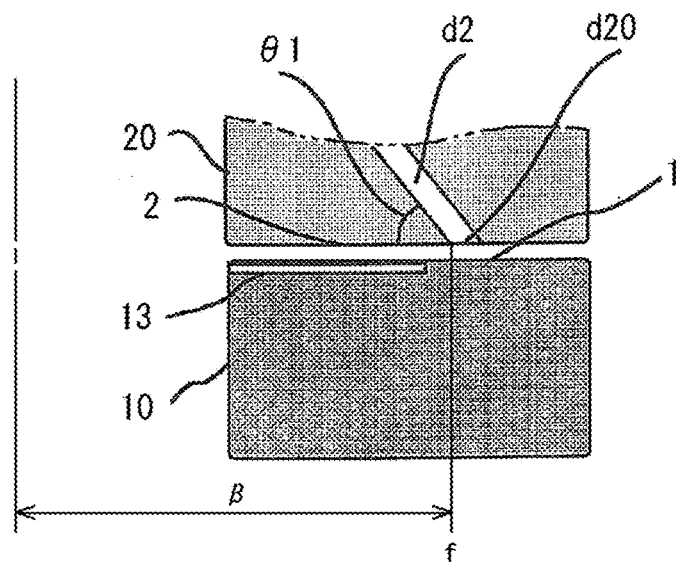
FIG. 3(A) is a sectional view of the second introduction member of the apparatus.
FIG. 3(B) is an enlarged view showing an important part of the processing surface for explaining the second introduction member.
Figure 3:
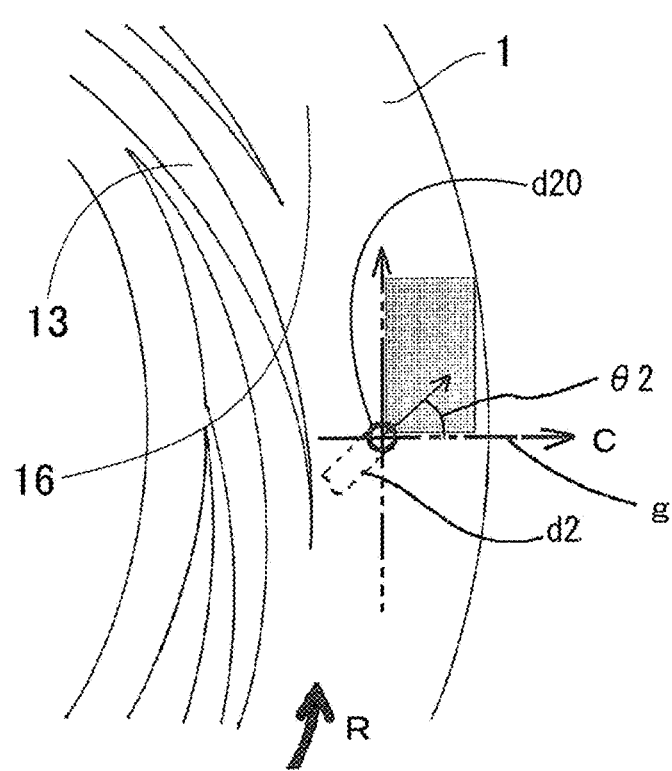

The fluid processing apparatus shown in FIG. 1 to FIG. 3 which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(B), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process (ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P=P1\times(K-k)+Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction. Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the movement of fluid, the dimensionless number which expresses the ratio of inertia force to viscosity force is called as Reynolds number, which is expressed by the following equation.

$$\text{Reynolds number } Re=\text{inertia force/viscosity force}=\rho VL/\mu=VL/\nu$$

Here, $\nu=\mu/\rho$ shows dynamic viscosity, V shows representative velocity, L shows representative length, $\rho$ shows density, and $\mu$ shows viscosity.

Flow of the fluid changes at the borderline of the critical Reynolds number; namely below the critical Reynolds number is the laminar flow, while above the critical Reynolds number is the turbulent flow.

Because the space between the processing surfaces 1 and 2 of the fluid processing apparatus is controlled so narrow that amount of the fluid that kept between the processing surfaces 1 and 2 is extremely small. Therefore, the representative length L is very short, so that the centrifugal force of the thin film fluid which passes through between the processing surfaces 1 and 2 is so small that the effect of the viscosity force in the thin film fluid becomes large. Accordingly the Reynolds number becomes smaller so that the thin film fluid becomes the laminar flow.

The centrifugal force, one of the inertia forces in rotation movement, is a force acting from a center to an outside. The centrifugal force can be expressed by the following equation.

$$\text{Centrifugal force } F=ma=mv^2/R$$

Here, "a" shows acceleration, "m" shows mass, "v" shows velocity, and R shows radius.

As mentioned above, amount of the fluid kept between the processing surfaces 1 and 2 is so small so that the ratio of the velocity relative to the fluid mass becomes very large, so that the said mass can be neglected. Accordingly, the effect of gravity can be neglected in the thin film fluid formed between the processing surfaces 1 and 2. Because of this, a microparticle of an alloy or a composite metal compound which contains two or more metal elements having different specific gravities can be obtained in the thin film fluid formed between the processing surfaces 1 and 2, even though these are intrinsically difficult to be obtained as the microparticle.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening d20 may be circular as shown in FIG. 2(B) and FIG. 3(B), or a concentric circular ring shape which encircles the central opening of the processing surface 2 having a form of a ring-like disk, though this is not shown by a drawing. In the case that the opening is made in the circular ring shape, the opening having the circular ring shape may be any of continuous and discontinuous.

If the opening d20 having the circular ring shape is arranged in the way that it encircles concentrically around the central opening of the processing surface 2, the second fluid can be processed under the same condition in the circumferential direction at the time when the second fluid is introduced into between the processing surfaces 1 and 2; and thus, if the microparticle is wanted to be produced in large quantity, the shape of the opening is preferably made in the concentric circular ring shape.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the present invention, the circumferential speed of the rotation at a converging point at which at least two fluids to be processed are converged together means the circumferential speed of the processing surfaces 1 and 2 in the nearest site f from the rotational center of the first and second processing surfaces 1 and 2 (hereinafter this site is referred to as the nearest point f) in the opening d20 at which the first fluid and the second fluid are converged together as shown in FIG. 3(A); and specifically the circumferential speed is calculated from the following equation.

Circumferential speed (m/s)=2×β (m)×rotation speed (rpm)×π

Here, β shows the distance from the center of rotation of the first and second processing surfaces 1 and 2 to the nearest point f, the rotation speed is the rotation speed of the processing surfaces, and π shows the circular constant.

That is, the converging point at which at least two fluids to be processed are converged together means the nearest site to the rotational center of the first and second processing surfaces 1 and 2 in the opening part d20.

In the case that there are plurality of converging points which have different distances from the rotational center of the first and second processing surfaces 1 and 2, the nearest point to the center of the converging points at which the metal fluid and the separating fluid are converged together is taken as the nearest point f.

Control of the Circumferential Velocity:

In the present invention, the rate of coalescence of the microparticles by themselves may be controlled by controlling the circumferential velocity of the rotation at the converging site.

As mentioned above, in this embodiment, the first processing member 10 of the fluid processing apparatus rotates relative to the second processing member 20 thereby rotating the first processing surface 1 relative to the second processing surface 2, whereby the circumferential velocity of the first processing surface 1 at the converging site is controlled. On the other hand, in the case that both the first processing surface 1 and the second processing surface 2 rotate, by controlling the relative circumferential velocity of them at the converging site, the rate of coalescence of the microparticles by themselves can be controlled.

In addition, by controlling the circumferential velocity of the rotation at the converging site, the particle diameter of the microparticles can be controlled. It is generally said that by coalescing microparticles by themselves, coarse particles having wide particle diameter distribution are generated; however, in the present invention, the particle diameter of the microparticles to be obtained can also be controlled by controlling the rate of coalescence of the microparticles by themselves.

In the present invention, the circumferential velocity of the rotation at the converging site is preferably in the range of 0.8 to 41.9 m/sec, or more preferably in the range of 1.2 to 21.0 m/sec. If the circumferential velocity at the converging site is less than 1 m/sec, the at least two fluids to be processed cannot be uniformly mixed thereby failing to facilitate the uniform processing to obtain microparticles; and thus, microparticles cannot be obtained stably. On the other hand, if the circumferential velocity of the rotation at the converging site is more than 42 m/sec, the fluid to be processed is vaporized due to temperature rise of the processing surfaces whereby causing increase of the pressure between the processing surfaces 1 and 2; and as a result, there may be a case to cause a phenomenon that the at least two fluids to be processed cannot be stably supplied. As discussed above, outside the specified range, it is difficult to produce the microparticles continuously.

Illustrative example of the evaluation method of coalescence of the microparticles by themselves or of the rate of coalescence of the microparticles by themselves includes the electron microscopic observation methods by means of a transmittance electron microscope (TEM) and a scanning electron microscope (SEM), the specific surface area measurement method typically represented by the BET method, comparison of the microscopic observation with the specific surface area measurement, and comparison of the specific surface area measurement with the particle diameter distribution measurement. In the present invention, the evaluation was made by the rate of coalescence of the microparticles by themselves by the electron microscopic observation.

Specifically, the TEM picture or the SEM picture with the same magnification of the prepared microparticles was divided into 16 areas; and if no coalescence of the microparticles by themselves was confirmed in all of the areas, then this was evaluated as "0%"; if coalescence of the microparticles by themselves was confirmed in all of the areas, then this was evaluated as "100%"; and if coalescence of the microparticles by themselves was confirmed in 3 areas out of 16 areas, then this was evaluated as "19%". There exist plural microparticles in one area, and if at least two microparticles out of them form the coalescence, then this was evaluated as confirmation of the coalescence of the microparticles by themselves.

In the present invention, the rate of coalescence of the microparticles by themselves is preferably 50% or less, more preferably 40% or less, or still more preferably 30% or less.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned fluid processing apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing microparticles by using the above-mentioned apparatus will be explained.

In the fluid processing apparatus as mentioned above, the raw material fluid which contains at least one raw material is mixed with the processing fluid which contains at least one substance to process the raw material in the thin film fluid formed between the processing surfaces 1 and 2 which are disposed in a position they are faced with each other so as to be able to approach to and separate from each other, at least one of which rotates relative to the other whereby obtaining microparticles of the processed raw material. This method is characterized by that during this process, by controlling the circumferential velocity of the rotation at the converging site in which the raw material fluid and the processing fluid are converged, the rate of coalescence of the microparticles by themselves is controlled.

The producing method for the microparticles takes place in the apparatus as shown in FIG. 1 of the present application while the fluids are being mixed forcibly and uniformly between the processing surfaces 1 and 2 which are disposed in a position they are faced with each other so as to be able to approach to and separate from each other, at least one of which rotates relative to the other.

At first, the raw material fluid is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Next, from the second introduction part d2, which is the separate flow path, the processing fluid is introduced as the second fluid directly into the first fluid film formed between the processing surfaces 1 and 2.

By so doing, the first fluid and the second fluid are mixed between the processing surfaces 1 and 2 while the distance therebetween is fixed by pressure balance between the supply pressure of the fluids to be processed and the pressure that is applied between the rotating processing surfaces, thereby obtaining the processed raw material microparticles.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In addition, in the present invention, a post-treatment such as heat treatment may be applied to the microparticles of the processed raw material as mentioned above.

As mentioned before, the processing apparatus may be provided with, in addition to the first introduction part d1 and the second introduction part d2, the third introduction part d3; and in this case, for example, each of the first fluid, the second fluid, and the third fluid may be introduced respectively into the processing apparatus. By so doing, concentration and pressure of each fluid can be controlled separately so that the process to obtain microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided. In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

pH Region:

In the present invention, there is no particular restriction as to the pH of the raw material fluid and/or the processing fluid. It may be arbitrarily changed in accordance with the kinds and the concentrations of the raw material and/or the substance to process the raw material to be used, the purpose, the kind of microparticles to be targeted, and the like.

Dispersing Agent and So Forth:

In the present invention, various dispersing agents and surfactants may be used in accordance with the purpose and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various polymers. These may be used singly or as a combination of two or more of them.

The surfactants and dispersing agents may be contained in the raw material fluid, in the processing fluid, or in the both fluids. Alternatively, the surfactants and the dispersing agents may be contained in a third fluid that is different from the raw material fluid and the processing fluid.

In the present invention, the surfactant and the dispersant as mentioned above may be used, or may not be used. In the present invention, control of the circumferential velocity of the rotation at the converging site in which the raw material fluid and the processing fluid are converged may be executed concurrently with use of the surfactant and the dispersant.

Temperature:

In the present invention, temperature at the time of mixing of the raw material fluid with the processing fluid is not particularly restricted. Temperature may be appropriately selected in accordance with the kinds and the concentrations of the raw material and/or the substance to process the raw material to be used, the kind of the microparticles to be targeted, the pH of the raw material fluid and the processing fluid, and so forth.

The method for producing microparticles according to the present invention may be used in production of the following microparticles. Note that, the present invention is not applied only to the following examples; it can also be used for producing of microparticles that have been produced by means of conventional methods such as a batch process, a continuous process, a microreactor, and a micromixer.

Thus, the example mentioned above includes:

a reaction to obtain pigment particles by mixing an acidic pigment solution, prepared by dissolving at least one kind of pigment in a strong acid such as sulfuric acid, nitric acid, and hydrochloric acid, with a solution including water (acid pasting method), a reaction to precipitate pigment particles by pouring a pigment solution, prepared by dissolving at least one kind of pigment in an organic solvent, into a poor solvent which is a poor solvent to the said pigment and is compatible with the organic solvent used to prepare the pigment solution (reprecipitation method), or a reaction to obtain pigment particles by mixing a pigment solution, obtained by dissolving at least one kind of pigment either into a pH adjusting acidic or alkaline solution or into a mixed solution of the said pH adjusting solution with an organic solvent, with a pigment-separating solution not showing solubility to the pigment contained in the pigment solution or showing smaller solubility to the pigment than the solvent contained in the pigment solution, and yet being capable of changing pH of the pH adjusting solution.

A reaction to carry metal fine particles on a carbon and a carbon black surface by a liquid phase reduction method (illustrative example of the metal includes at least one metal selected from the group consisting of platinum, palladium, gold, silver, rhodium, iridium, ruthenium, osmium, cobalt, manganese, nickel, iron, chromium, molybdenum, and titanium).

A reaction to produce crystals formed of a fullerene molecule and a fullerene nanowhisker/nanofiber nanotube by mixing a solution containing a first solvent having dissolved therein the fullerene with a second solvent having smaller solubility of the fullerene than the first solvent.

As described above, a reaction to reduce a metal, a metal compound or a metal ion.

A reaction to hydrolyze a ceramic raw material (illustrative example of the ceramic raw material includes at least one kind selected from Al, Ba, Mg, Ca, La, Fe, Si, Ti, Zr, Pb, Sn, Zn, Cd, As, Ga, Sr, Bi, Ta, Se, Te, Hf, Ni, Mn, Co, S, Ge, Li, B, and Ce).

A reaction to separate titanium dioxide superfine particles by hydrolysis of a titanium compound (illustrative example of the titanium compound includes at least one kind selected from tetraalkoxy titanium such as tetramethoxy titanium, tetraethoxy titanium, tetra-n-propoxy titanium, tetraisopropoxy titanium, tetra-n-butoxy titanium, tetraisobutoxy titanium, and tetra-t-butoxy titanium, or a derivative of them; and titanium tetrachloride, titanyl sulfate, titanium citrate, and titanium tetranitrate).

A producing reaction to co-precipitate and separate fine particles of a compound semiconductor by joining with an ion-containing fluid, which is a semiconductor raw material and contains different elements (illustrative example of the compound semiconductor includes a compound semiconductor of the II-VI groups, a compound semiconductor of the III-V groups, a compound semiconductor of the IV group, a compound semiconductor of the I-III-VI groups).

A reaction to produce semiconductor fine particles by reducing a semiconductor element (illustrative example of the semiconductor element includes an element selected form the group consisting of silicon (Si), germanium (Ge), carbon (C), and tin (Sn)).

A reaction to produce magnetic fine particles by reducing a magnetic raw material (illustrative example of the magnetic raw material includes at least one kind selected from nickel, cobalt, iridium, iron, platinum, gold, silver, manganese, chromium, palladium, yttrium, and lanthanide (neodymium, samarium, gadolinium, and terbium)).

A reaction to separate biologically ingestible fine particles by mixing a fluid which at least one kind of raw material of the biologically ingestible fine particles is dissolved in a first solvent with a solvent capable of becoming a second solvent having lower solubility of the biologically ingestible fine particles than the first solvent.

Alternatively, a reaction to separate biologically ingestible fine particles by a neutralization reaction caused by mixing a fluid containing at least one kind of an acidic substance or a cationic substance with a fluid containing at least one kind of a basic substance or an anionic substance. In the present invention, for example, in the case that barium sulfate fine particles to be ingested into a living body as a contrast agent are separated, a water-soluble barium salt solution as the raw material fluid is mixed with a water-soluble sulfate compound solution including sulfuric acid as the processing fluid, whereby separating barium sulfate fine particles by a neutralization reaction.

A treatment to obtain microemulsion particles by mixing a fluid to be processed that contains an oil phase component which contains a fat-soluble pharmacologically active substance with a fluid to be processed comprising at least aqueous dispersion solvent, or by mixing a fluid to be processed that contains a aqueous phase component which contains a water-soluble pharmacologically active substance with a fluid to be processed comprising at least an oil-based dispersion solvent.

Alternatively, a treatment to obtain a liposome by mixing a dispersed phase of a fluid to be processed with a continuous phase of a fluid to be processed, wherein at least anyone of the dispersed phase or the continuous phase contains one or more kind of phospholipid, the dispersed phase contains a pharmacologically active substance, and the continuous phase is comprised of at least an aqueous dispersion solvent.

A treatment to obtain resin fine particles by mixing a fluid in which a resin is dissolved in a solvent that has solubility and compatibility to the said resin with an aqueous solvent, thereby effecting separation or emulsification; and a treatment to obtain an emulsion by mixing an oil phase component such as a resin and an oil with a water phase component.

Alternatively, a treatment to obtain resin fine particles by mixing a resin in the molten state obtained by heating with a solvent (there is no restriction as to whether it is aqueous or oily), thereby effecting emulsification and dispersion. Further alternatively, a treatment to agglutinate resin fine particles by mixing a dispersion solution of resin fine particles with a compound solution having a compound such as a salt dissolved therein.

Reactions to obtain an organic compound by an organic reaction of an organic compound starting raw material with various reactants, the reactions such as Friedel-Crafts reaction, nitration reaction, addition reaction, elimination reaction, transfer reaction, polymerization reaction, condensation reaction, coupling reaction, acylation, carbonylation, aldehyde synthesis, peptide synthesis, aldol reaction, indole reaction, electrophilic substitution reaction, nucleophilic substitution reaction, Wittig reaction, Michael addition reaction, enamine synthesis, ester synthesis, enzymatic reaction, diazo coupling reaction, oxidation reaction, reducing reaction, multistep reaction, selective addition reaction, Suzuki-Miyaura coupling reaction, Kumada-Corriu reaction, methathesis reaction, isomerization reaction, radical polymerization reaction, anionic polymerization reaction, cationic polymerization reaction, metal-catalyzed polymerization reaction, consecutive reaction, polymer synthesis, acetylene coupling reaction, episulfide synthesis, episulfide synthesis, Bamberger rearrangement, Chapman rearrangement, Claisen condensation, quinoline synthesis, Paal-Knorr furan synthesis, Paal-Knorr pyrole synthesis, Passerini reaction, Paterno-Buchi reaction, carbonyl-ene reaction (Prins reaction), Jacobsen rearrangement, Koenigs-Knorr glucosidation reaction, Leuckart-Wallach reaction, Horner-Wadsworth-Emmons reaction, Gassman reaction, Noyori assymmetric hydrogenation reaction, Perkin reaction, Petasis reaction, Tishchenko reaction, Tishchenko reaction, Ullmann coupling, Nazarov cyclization, Tiffeneau-Demjanov rearrangement, template synthesis, oxidation using selenium dioxide, Reimer-Tiemann reaction, Grob cleavage reaction, haloform reaction, Malaprade glycol oxidative cleavage, Hofmann elimination, thiocarbonylation by using Lawesson reagent, Lossen rearrangement, cyclic ketone synthesis by using FAMSO, Favorskii rearrangement, Feist-Benary furan synthesis, Gabriel amine synthesis, Glaser reaction, Grignard reaction, Cope elimination, Cope rearrangement, diimide reduction of alkynes, Eschenmoser aminomethylation reaction, [2+2] photocyclization reaction, Appel reaction, aza-Wittig reaction, Bartoli indole synthesis, Carroll rearrangement, Chichibabin reaction, Clemmensen reduction, Combes quinoline synthesis, Tsuzi-Trost reaction, TEMPO oxidation, dihydroxylation by using osmium tetraoxide, Fries rearrangement, Neber rearrangement, Barton-McCombie deoxygenation, Barton decarboxylation, Seyferth-Gilbert alkyne synthesis, Pinnick (Kraus) oxidation, Itoh-Saegusa oxidation, Eschenmoser cleavage reaction, Eschenmoser-Claisen rearrangement, Doering-LaFlamme allene synthesis, Corey-Chakovsky reaction, acyloin condensation, Wolff-Kishner reduction, IBX oxidation, Parkin-Doering oxidation, Reissert reaction, Jacobsen's kinetic optical resolution hydrolysis, benzilic acid rearrangement, Hiyama cross-coupling, Luche reduction, oxy merculation, Vilismeier-Haak reaction, Wolff rearrangement, Kolbe-Schmitt reaction, Corey-Kim oxidation, Cannizzaro reaction, Henry reaction, transformation of an alcohol to an alkane, Arndt-Eistert synthesis, hydroformylation reaction, Peterson olefination, decarbonylation reaction, Curtius rearrangement, Wohl-Zeigler bromination at allyl position, Pfitzner-Moffatt oxidation, McMurry coupling, Barton reaction, Balz-Shiemann reaction, Masamune-Bergman reaction, Dieckmann condensation, pinacol coupling, Williamson ether synthesis, iodolactonization reaction, Harries ozone decomposition, oxidation by active manganese dioxide, alkyne cyclotrimerization reaction, Kumada-Tamao-Corriu cross-coupling, syn-β elimination of a sulfoxide and a selnoxide, Fisher indole synthesis, Oppenauer oxidation, Darzens condensation reaction, Alder ene reaction, Sarett-Collins oxidation, Nozaki-Hiyama-Kishi coupling reaction, Weinreb ketone synthesis, DAST fluorination, Corey-Winter olefin synthesis, Hosomi-Sakurai reaction, alcohol oxidation by using PCC (PDC), Jones oxidation, Keck allylation reaction, cyanide addition by using Nagata reagent, Negishi coupling, Ireland-Claisen rearrangement, Baeyer-Villiger oxidation, p-methoxybenzyl (PMB or MPM), dimethoxybenzyl (DMB) protection, deprotection, Wacker oxidation, Myers assymmetric alkylation, Yamaguchi macrolactonization, Mukaiyama-Corey macrolactonization, Bode peptide synthesis, Lindlar reduction, homogeneous hydrogenation, orthometallation, Wagner-Meerwein rearrangement, Wurtz reaction, ketone synthesis by using 1,3-dithiane, Michael addition, ketone synthesis by Stork enamine, Pauson-Khand cyclopentene synthesis, and Tebbe reaction.

A method to obtain microparticles wherein saturated solubility is changed by temperature difference between the fluids thereby separating a dissolved substance. For example, in the case of separating acyclovir (general name of JAN, INN; chemical name thereof is 9-[(2-hydroxyethoxy)methyl]guanine), an antiviral drug having a purine skeleton, an aqueous acyclovir solution which contains acyclovir as the microparticle raw material is mixed with a fluid having a temperature which is different from that of the fluid which contains the microparticle raw material, whereby separating the microparticles by utilizing change of the saturated solubility caused by temperature change of the fluid which contains the microparticle raw material.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed that is introduced through the first introduction part d1 of the processing apparatus as described before; and the second fluid means the second fluid to be processed that is introduced through the second introduction part d2 of the processing apparatus shown in FIG. 1, as described before.

Observation with Scanning Electron Microscope:

For the observation with a scanning electron microscope (SEM), the field emission scanning electron microscope (FE-SEM) JSM-7500F (manufactured by JEOL Ltd.) was used. Observation condition with the magnification of 5,000 or more was used; and as to the particle diameter, the average value of 10 observation spots was used. Hereunder, diameter of the microparticles confirmed by the SEM observation was taken as the particle diameter.

Observation with Transmission Electron Microscope:

For the observation with a transmission electron microscope (TEM), the energy dispersive X-ray spectroscopy JEM-2100 (manufactured by JEOL Ltd.) was used. Observation condition with the magnification of 10,000 or more was used; and as to the particle diameter, the average value of 10 observation spots was used. Hereunder, diameter of the microparticles confirmed by the TEM observation was also taken as the particle diameter.

By using the fluid processing apparatus shown in FIG. 1, the metal fluid (raw material fluid) having nickel nitrate hexahydrate ($NiNO_3 \cdot 6H_2O$), triethanol amine (TEA), and ammonium polyacrylate (PAA) dissolved in ethylene glycol (EG) and the reducing agent fluid (processing fluid) containing hydrazine monohydrate (HMH) and potassium hydroxide (KOH) were mixed in the thin film fluid formed between the processing surfaces 1 and 2, whereby separating the nickel microparticles in the thin film fluid.

As Examples 1 to 5, while the metal fluid (0.11 mol/L of $NiNO_3 \cdot 6H_2O$, 0.21 mol/L of TEA, 0.0002 mol/L of PAA in EG) as the first fluid was introduced from the center with the supply pressure of 0.50 MPaG and with the liquid temperature of 100° C. and the introduction rate of 1000 mL/min, the reducing agent fluid (15.8 mol/L of HMH and 4.3 mol/L of KOH in $H_2O$) with the liquid temperature of 25° C. was introduced as the second fluid into between the processing surfaces 1 and 2 at the introduction rate of 150 mL/minute, whereby the first fluid and the second fluid were mixed in the thin film fluid. Each of the supply temperatures of the first fluid and the second fluid was measured just before introduction of the first fluid and the second fluid into the processing apparatus (in more detail, just before introduction into between the processing surfaces 1 and 2). The dispersion solution of the nickel microparticles was discharged from between the processing surfaces 1 and 2. The nickel microparticles in the dispersion solution of the nickel microparticles that was discharged therefrom were collected by filtration, washed by pure water for 3 times, and then dried at 25° C. under vacuum of −0.1 MPaG. The particle diameter of the obtained nickel microparticles was confirmed by the SEM observation. Meanwhile, pH of the first fluid was 6.99, and pH of the second fluid was 14 or higher (measured by the pH test paper).

Figure 4:
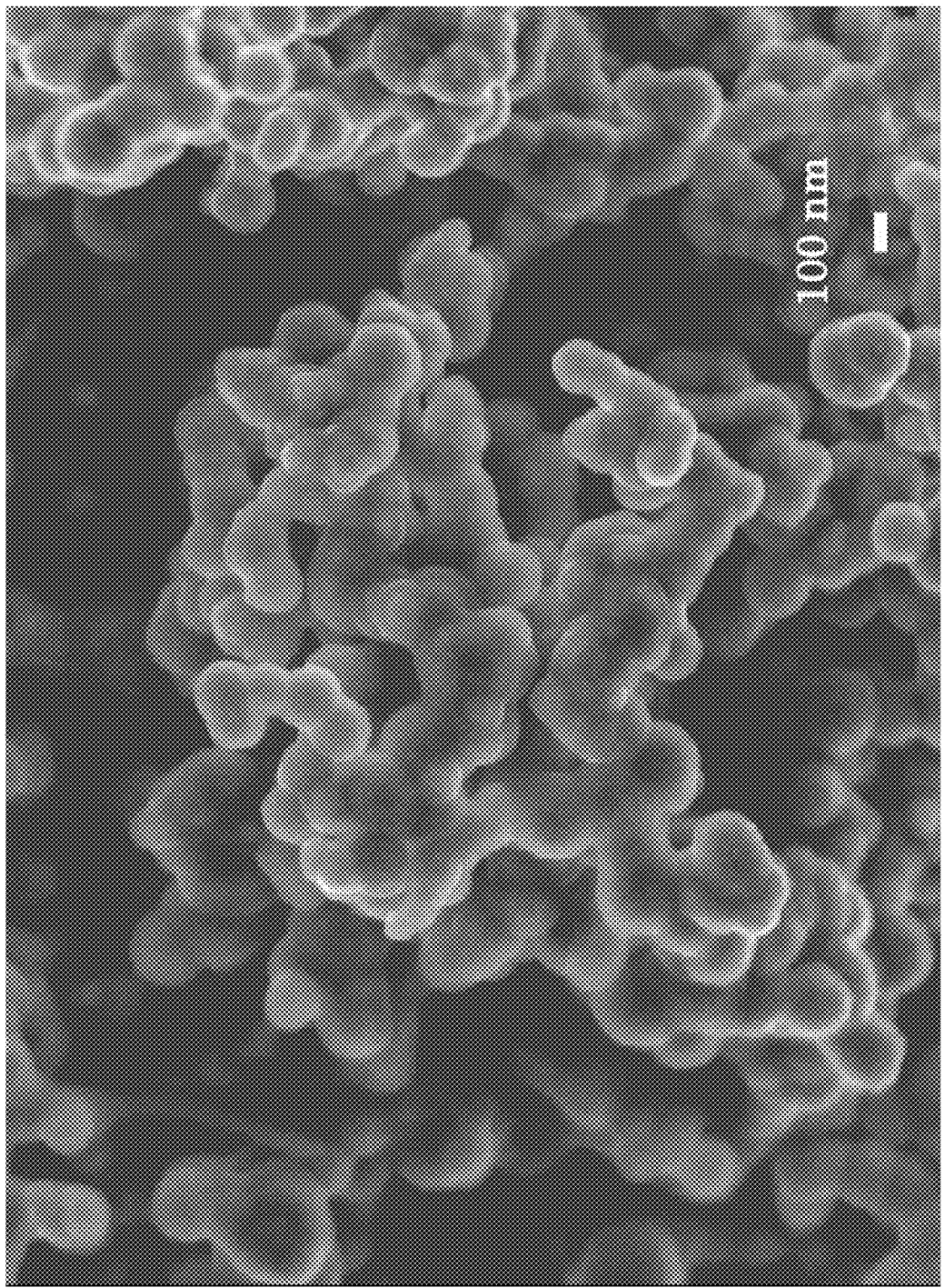
FIG. 4 is a SEM picture of nickel microparticles produced in Example 2 of the present invention.

In Table 1, in Examples 1 to 5, the results are shown as to the case in which the circumferential velocity at the converging site of the first fluid and the second fluid in the first processing surface 1 was changed. In these examples, only the circumferential velocity at the converging site in the first processing surface 1 was changed, while other conditions were all the same. In FIG. 4, the SEM picture of the nickel microparticles obtained in Example 2 is shown; and in FIG. 5, the SEM picture of the nickel microparticles obtained in Example 5 is shown. The "Rate of coalescence of microparticles by themselves" in Table 1 means that the SEM picture with the same magnification of the nickel microparticles obtained each in Examples 1 to 5 was divided into 16 areas; and if no coalescence of the nickel microparticles by themselves was confirmed in all of the areas, then this was evaluated as "0%"; if coalescence of the nickel microparticles by themselves was confirmed in all of the areas, then this was evaluated as "100%"; and if coalescence of the nickel microparticles by themselves was confirmed in 3 areas out of 16 areas, then this was evaluated as "19%.". There exist plural nickel microparticles in one area, and if at least two nickel microparticles out of them form the coalescence, then this was evaluated as confirmation of the coalescence of the nickel microparticles by themselves.

TABLE 1

| Example | Circumferential velocity (m/sec) | Particle diameter (nm) | Rate of coalescence of microparticles by themselves (%) |
|---|---|---|---|
| 1 | 1.26 | 742 | 94 |
| 2 | 2.09 | 452 | 63 |
| 3 | 4.19 | 331 | 31 |
| 4 | 12.57 | 215 | 13 |
| 5 | 20.94 | 151 | 0 |

From Table 1, it was confirmed that during the time when the first fluid and the second fluid were mixed in the thin film fluid, by controlling the circumferential velocity at the converging site in the first processing surface 1, the rate of coalescence of the nickel microparticles by themselves could be controlled. Further, from Table 1, it was confirmed that during the time when the first fluid and the second fluid were mixed in the thin film fluid, by controlling the circumferential velocity at the converging site in the first processing surface 1, the particle diameter of the nickel microparticles could be controlled.

As to the rate of coalescence of the nickel microparticles by themselves, as shown in Table 1, it was confirmed that by slowing the circumferential velocity at the converging site in the first processing surface 1, the rate of coalescence of the nickel microparticles by themselves could be controlled so as to be higher, and that by accelerating the circumferential velocity at the converging site in the first processing surface 1, the rate of coalescence of the nickel microparticles by themselves could be controlled so as to be lower. Especially in Examples 3 to 5, it was confirmed that the rates of coalescence of the nickel microparticles by themselves were low.

Figure 5:
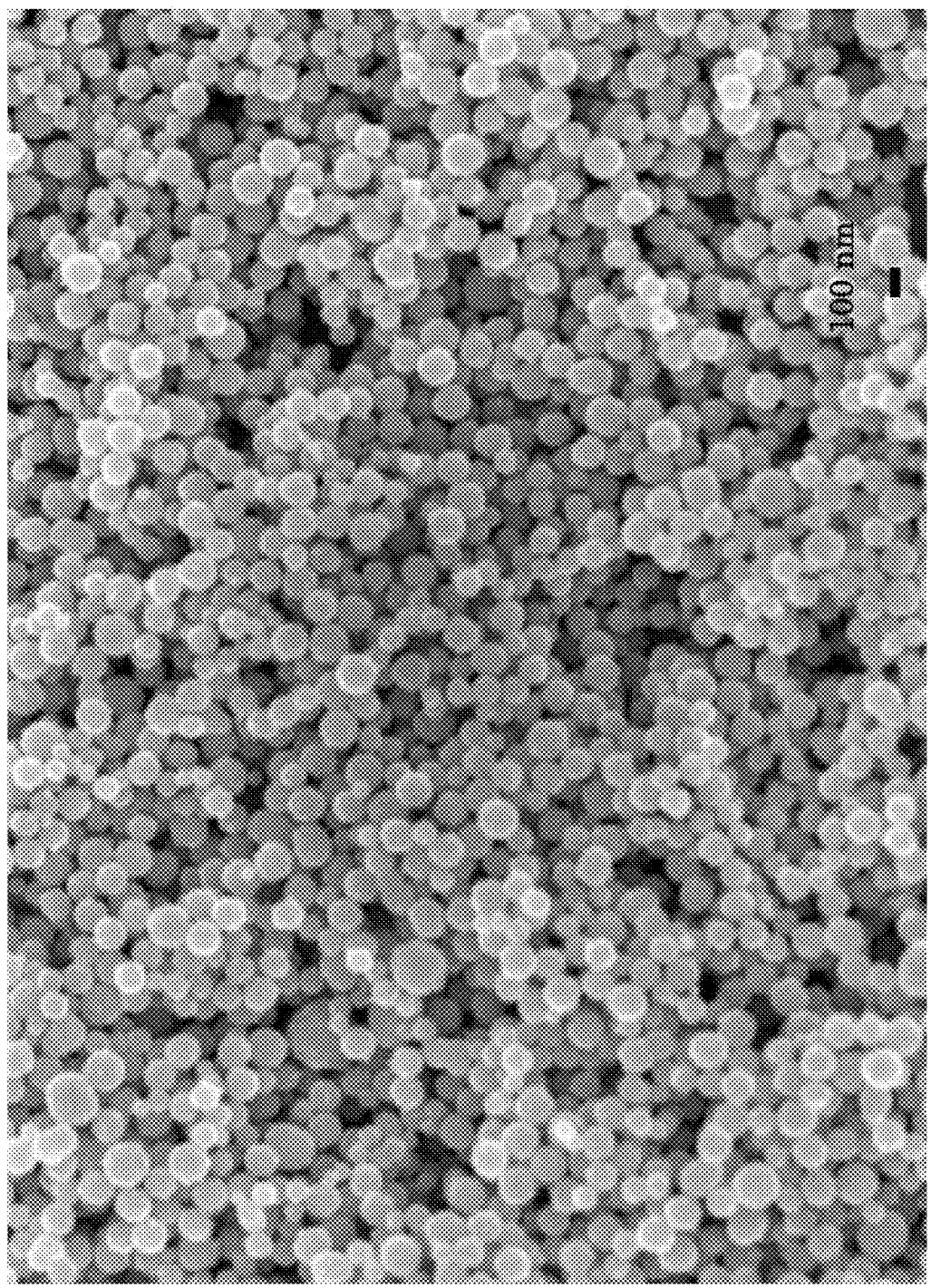
FIG. 5 is a SEM picture of nickel microparticles produced in Example 5 of the present invention.

Furthermore, as to the particle diameter of the nickel microparticles, as shown in Table 1, it was confirmed that by slowing the circumferential velocity at the converging site in the first processing surface 1, the particle diameter of the nickel microparticles could be controlled so as to be larger, and that by accelerating the circumferential velocity at the converging site in the first processing surface 1, the particle diameter of the nickel microparticles could be controlled so as to be smaller. As shown in FIG. 4, in the region in which the circumferential velocity at the converging site in the first processing surface 1 was comparatively slower (Examples 1 and 2), it was confirmed that separation of the nickel microparticles among themselves was poor, resulting formation of the coalescence. On the other hand, as shown in FIG. 5, in the region in which the circumferential velocity at the converging site in the first processing surface 1 was faster than Example 2 (Examples 3 to 5), it was confirmed that separation state of the nickel microparticles among themselves was bettered, whereby it was confirmed that the particle diameter of the nickel microparticles obtained from each Example could be controlled.

Accordingly, from the above results, it was confirmed that by controlling the circumferential velocity at the converging site in the first processing surface 1, the rate of coalescence of the nickel microparticles by themselves could be controlled, and also that the particle diameter of the nickel microparticles could be controlled.

Then, by using the fluid processing apparatus shown in FIG. 1, the metal fluid (raw material fluid) having cupric chloride ($CuCl_2$) dissolved in ethylene glycol (EG) and the reducing agent fluid (processing fluid) containing hydrazine monohydrate (HMH) and 0.5 mol/L of potassium hydroxide (KOH) in ethanol (0.5 mol/L of KOH in EtOH) were mixed in the thin film fluid formed between the processing surfaces 1 and 2, whereby separating the copper microparticles in the thin film fluid.

As Examples 6 to 10, while the reducing agent fluid (1% by weight of HMH and 5% by weight of 0.5 mol/L KOH in EtOH/EG (pH=12.18)) as the first fluid was introduced from the center with the supply pressure of 0.50 MPaG and with the liquid temperature of 120° C. and the introduction rate of 1000 mL/min, the metal fluid (3% by weight of $CuCl_2$ in EG (pH=3.12)) with the liquid temperature of 21° C. was introduced as the second fluid into between the processing surfaces 1 and 2 at the introduction rate of 20 mL/minute, whereby the first fluid and the second fluids were mixed in the thin film fluid. Each of the supply temperatures of the first fluid and the second fluid was measured just before introduction of the first fluid and the second fluid into the processing apparatus (in more detail, just before introduction into between the processing surfaces 1 and 2). The dispersion solution of the copper microparticles was discharged from between the processing surfaces 1 and 2. The copper microparticles in the dispersion solution of the copper microparticles that was discharged therefrom were collected by filtration, washed by methanol for 5 times, and then dried at 25° C. under vacuum of −0.1 MPaG. The particle diameter of the obtained copper microparticles was confirmed by the SEM observation.

In Table 2, in Examples 6 to 10, the results are shown as to the case in which the circumferential velocity at the converging site of the first fluid and the second fluid in the first processing surface 1 was changed. In these examples, only the circumferential velocity at the converging site in the first processing surface 1 was changed, while other conditions were all the same. The "Rate of coalescence of microparticles by themselves" in Table 2 means that the SEM picture with the same magnification of the copper microparticles obtained each in Examples 6 to 10 was divided into 16 areas; and if no coalescence of the copper microparticles by themselves was confirmed in all of the areas, then this was evaluated as "0%"; if coalescence of the copper microparticles by themselves was confirmed in all of the areas, then this was evaluated as "100%"; and if coalescence of the copper microparticles by themselves was confirmed in 3 areas out of 16 areas, then this was evaluated as "19%". There exist plural copper microparticles in one area, and if at least two microparticles out of them form the coalescence, then this was evaluated as confirmation of the coalescence of the copper microparticles by themselves.

TABLE 2

| Example | Circumferential velocity (m/sec) | Particle diameter (nm) | Rate of coalescence of microparticles by themselves (%) |
|---|---|---|---|
| 6 | 1.26 | 116 | 88 |
| 7 | 4.19 | 81 | 31 |
| 8 | 7.12 | 52 | 19 |
| 9 | 12.57 | 31 | 13 |
| 10 | 20.94 | 11 | 6 |

From Table 2, it was confirmed that during the time when the first fluid and the second fluid were mixed in the thin film fluid, by controlling the circumferential velocity at the converging site in the first processing surface 1, the rate of coalescence of the copper microparticles by themselves could be controlled. Further, from Table 2, it was confirmed that during the time when the first fluid and the second fluid were mixed in the thin film fluid, by controlling the circumferential velocity at the converging site in the first processing surface 1, the particle diameter of the copper microparticles could be controlled.

As to the rate of coalescence of the copper microparticles by themselves, as shown in Table 2, it was confirmed that by slowing the circumferential velocity at the converging site in the first processing surface 1, the rate of coalescence of the copper microparticles by themselves could be controlled so as to be higher, and that by accelerating the circumferential velocity at the converging site in the first processing surface 1, the rate of coalescence of the copper microparticles by themselves could be controlled so as to be lower. Especially in Examples 7 to 10, it was confirmed that the rates of coalescence of the copper microparticles by themselves were low.

Furthermore, as to the particle diameter of the copper microparticles, as shown in Table 2, it was confirmed that by slowing the circumferential velocity at the converging site in the first processing surface 1, the particle diameter of the copper microparticles could be controlled so as to be larger, and that by accelerating the circumferential velocity at the converging site in the first processing surface 1, the particle diameter of the copper microparticles could be controlled so as to be smaller. In the region in which the circumferential velocity at the converging site in the first processing surface 1 was comparatively slower (Example 6), it was confirmed that separation of the copper microparticles among themselves was poor, resulting formation of the coalescence. On the other hand, in the region in which the circumferential velocity at the converging site in the first processing surface 1 was faster than Example 6 (Examples 7 to 10), as shown in Table 2, it was confirmed that separation state of the copper microparticles among themselves was bettered, whereby it was confirmed that the particle diameter of the copper microparticles obtained from each Example could be controlled.

Accordingly, from the above results, it was confirmed that by controlling the circumferential velocity at the converging site in the first processing surface 1, the rate of coalescence of the copper microparticles by themselves could be controlled, and also that the particle diameter of the copper microparticles could be controlled.

Next, by using the fluid processing apparatus shown in FIG. 1, the metal fluid having silver nitrate dissolved in pure water (raw material fluid) was mixed with the reducing agent fluid containing ascorbic acid (processing fluid) in the thin film fluid formed between the processing surfaces 1 and 2 to separate the silver microparticles in the thin film fluid.

As Examples 11 to 15, while the reducing agent fluid (2% by weight of aqueous ascorbic acid solution (pH=2.50)) as the first fluid was introduced from the center with the supply pressure of 0.090 MPaG and with the liquid temperature of 20.8° C. and the introduction rate of 400 mL/min, the metal fluid (5.67% by weight of aqueous silver nitrate solution (pH=5.30)) with the liquid temperature of 22.5° C. was introduced as the second fluid into between the processing surfaces 1 and 2 at the introduction rate of 10 mL/minute, whereby the first fluid and the second fluids were mixed in the thin film fluid. Each of the supply temperatures of the first fluid and the second fluid was measured just before introduction of the first fluid and the second fluid into the processing apparatus (in more detail, just before introduction into between the processing surfaces 1 and 2). The dispersion solution of the silver microparticles was discharged from between the processing surfaces 1 and 2. The silver microparticles in the dispersion solution of the silver microparticles that was discharged therefrom were collected by filtration, washed by pure water for 3 times, and then dried at 25° C. under vacuum of −0.1 MPaG. The particle diameter of the obtained silver microparticles was confirmed by the SEM observation.

Figure 6:
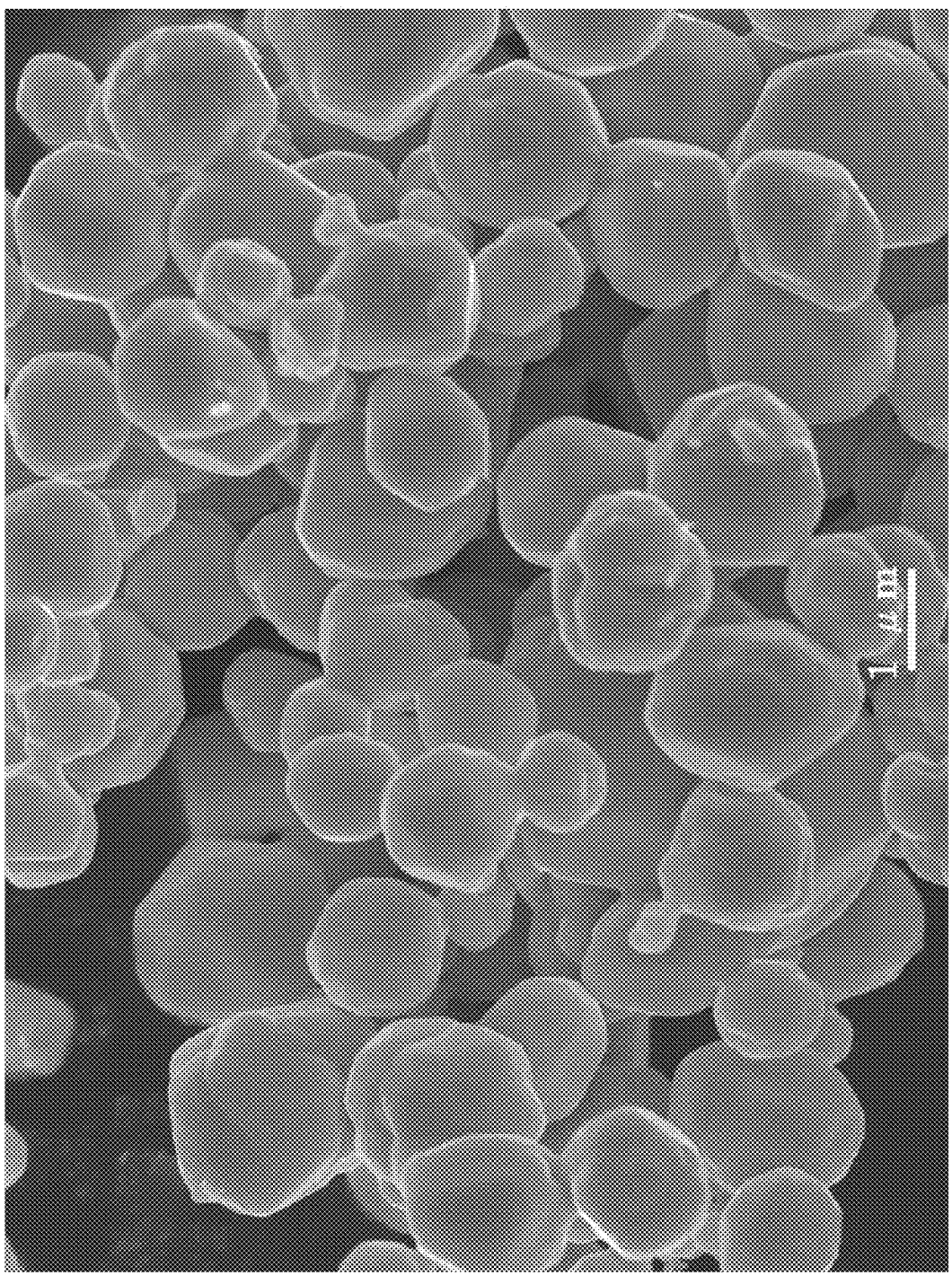
FIG. 6 is a SEM picture of silver microparticles produced in Example 13 of the present invention.

In Table 3, in Examples 11 to 15, the results are shown as to the case in which the circumferential velocity at the converging site of the first fluid and the second fluid in the first processing surface 1 was changed. In these examples, only the circumferential velocity at the converging site in the first processing surface 1 was changed, while other conditions were all the same. In FIG. 6, the SEM picture of the silver microparticles obtained in Example 13 is shown. The "Rate of coalescence of microparticles by themselves" in Table 3 means that the SEM picture with the same magnification of the silver microparticles obtained each in Examples 11 to 15 was divided into 16 areas; and if no coalescence of the silver microparticles by themselves was confirmed in all of the areas, then this was evaluated as "0%"; if coalescence of the silver microparticles by themselves was confirmed in all of the areas, then this was evaluated as "100%"; and if coalescence of the silver microparticles by themselves was confirmed in 3 areas out of 16 areas, then this was evaluated as "19%". There exist plural silver microparticles in one area, and if at least two microparticles out of them form the coalescence, then this was evaluated as confirmation of the coalescence of the silver microparticles by themselves.

TABLE 3

| Example | Circumferential velocity (m/sec) | Particle diameter (nm) | Rate of coalescence of microparticles by themselves (%) |
|---|---|---|---|
| 11 | 1.68 | 3412 | 0 |
| 12 | 3.35 | 2985 | 6 |
| 13 | 5.03 | 1316 | 25 |
| 14 | 7.12 | 4246 | 50 |
| 15 | 15.08 | 7187 | 81 |

From Table 3, it was confirmed that during the time when the first fluid and the second fluid were mixed in the thin film fluid, by controlling the circumferential velocity at the converging site in the first processing surface 1, the rate of coalescence of the silver microparticles by themselves could be controlled. In addition, from Table 3, it was confirmed that during the time when the first fluid and the second fluid were mixed in the thin film fluid, by controlling the circumferential velocity at the converging site in the first processing surface 1, the particle diameter of the silver microparticles could be controlled.

As to the rate of coalescence of the silver microparticles by themselves, as shown in Table 3, it was confirmed that by slowing the circumferential velocity at the converging site in the first processing surface 1, the rate of coalescence of the silver microparticles by themselves could be controlled so as to be lower, and that by accelerating the circumferential velocity at the converging site in the first processing surface 1, the rate of coalescence of the silver microparticles by themselves could be controlled so as to be higher. Especially in Examples 11 to 13, it was confirmed that the rates of coalescence of the silver microparticles by themselves were low.

Further, as to the particle diameter of the silver microparticles, it was confirmed that by changing the circumferential velocity at the converging site in the first processing surface 1, the particle diameter of the obtained silver microparticles changed. It was confirmed that in the region in which the circumferential velocity at the converging site in the first processing surface 1 was fast (Example 15), separation of the silver microparticles among themselves was poor. Also as shown in Table 3, it was confirmed that in the region in which the circumferential velocity at the converging site in the first processing surface 1 was slow (Example 11), separation state of the silver microparticles among themselves was bettered, whereby it was confirmed that the particle diameter of the silver microparticles obtained from each Example could be controlled.

From the above results, it was confirmed that by controlling the circumferential velocity at the converging site in the first processing surface 1, the rate of coalescence of the silver microparticles by themselves could be controlled, and also that the particle diameter of the obtained silver microparticles could be controlled.

Preparation of Microparticles of Acryl Monomer Emulsion:

Next, by using the fluid processing apparatus shown in FIG. 1, an acryl monomer containing a polymerization initiator (raw material fluid) and the processing fluid containing polyvinyl alcohol (PVA) as a polymer dispersant were mixed in the thin film fluid formed between the processing surfaces 1 and 2, and emulsified in the thin film fluid to obtain microparticles of the acryl monomer emulsion. Hereinafter, the microparticles of the acryl monomer emulsion are referred to as the acryl monomer microparticles.

As Examples 16 to 20, while the processing fluid (2.5% by weight of aqueous PVA) as the first fluid was introduced from the center with the supply pressure of 0.100 MPaG and with the liquid temperature of 30.1° C. and the introduction rate of 50 mL/min, the raw material fluid (acryl monomer containing a polymerization initiator) with the temperature of 40.4° C. was introduced as the second fluid into between the processing surfaces 1 and 2 at the introduction rate of 1 mL/minute, whereby the first fluid and the second fluids were mixed in the thin film fluid. Each of the supply temperatures of the first fluid and the second fluid was measured just before introduction of the first fluid and the second fluid into the processing apparatus (in more detail, just before introduction into between the processing surfaces 1 and 2). The dispersion solution of the acryl monomer microparticles was discharged from between the processing surfaces 1 and 2. The acryl monomer microparticles in the dispersion solution of the acryl monomer microparticles that was discharged therefrom were heat-treated; and the particle diameter of the obtained acryl polymer microparticles was confirmed by the SEM observation.

Figure 7:
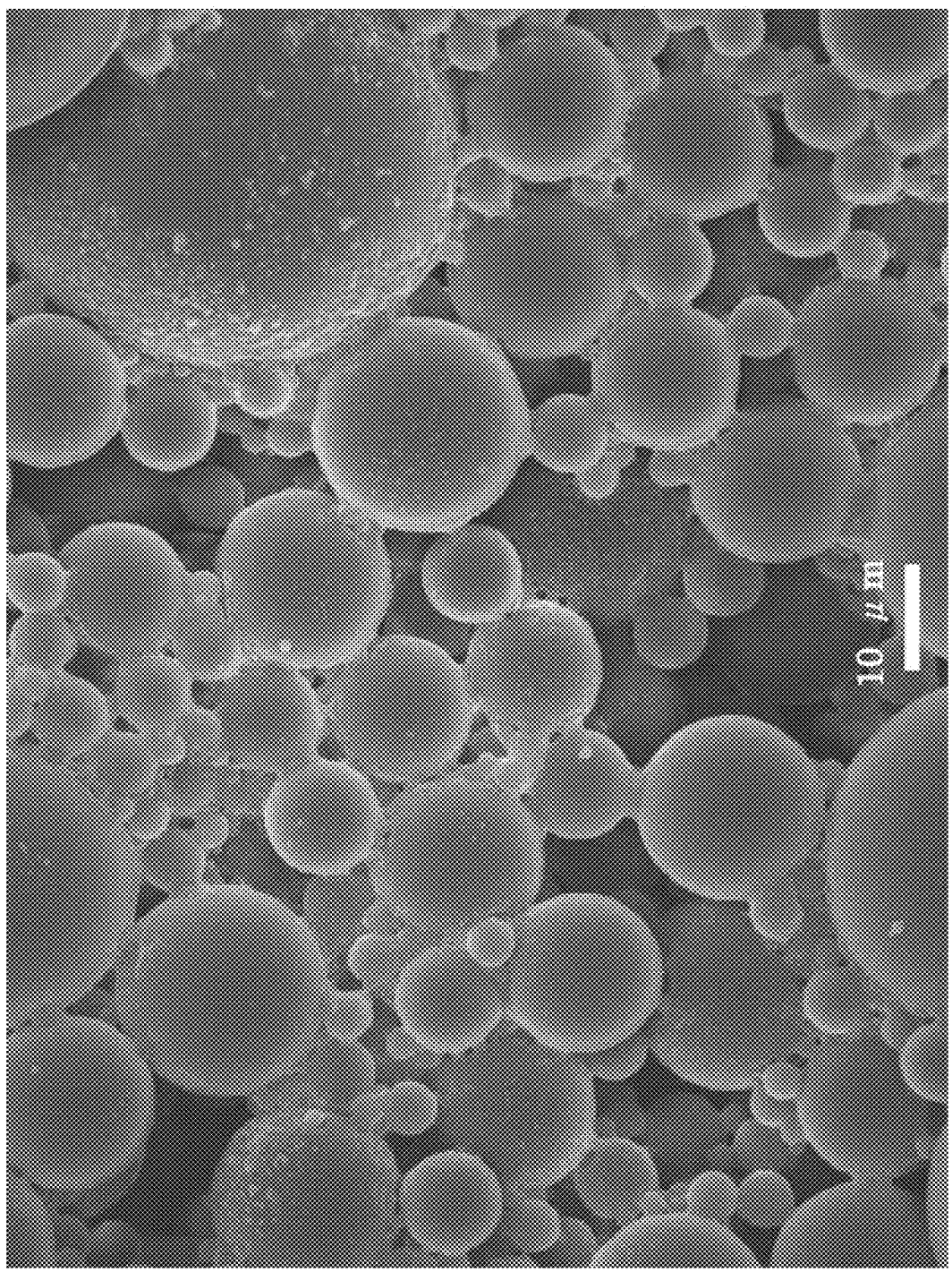
FIG. 7 is a SEM picture of acryl polymer microparticles produced in Example 16 of the present invention.
Figure 8:
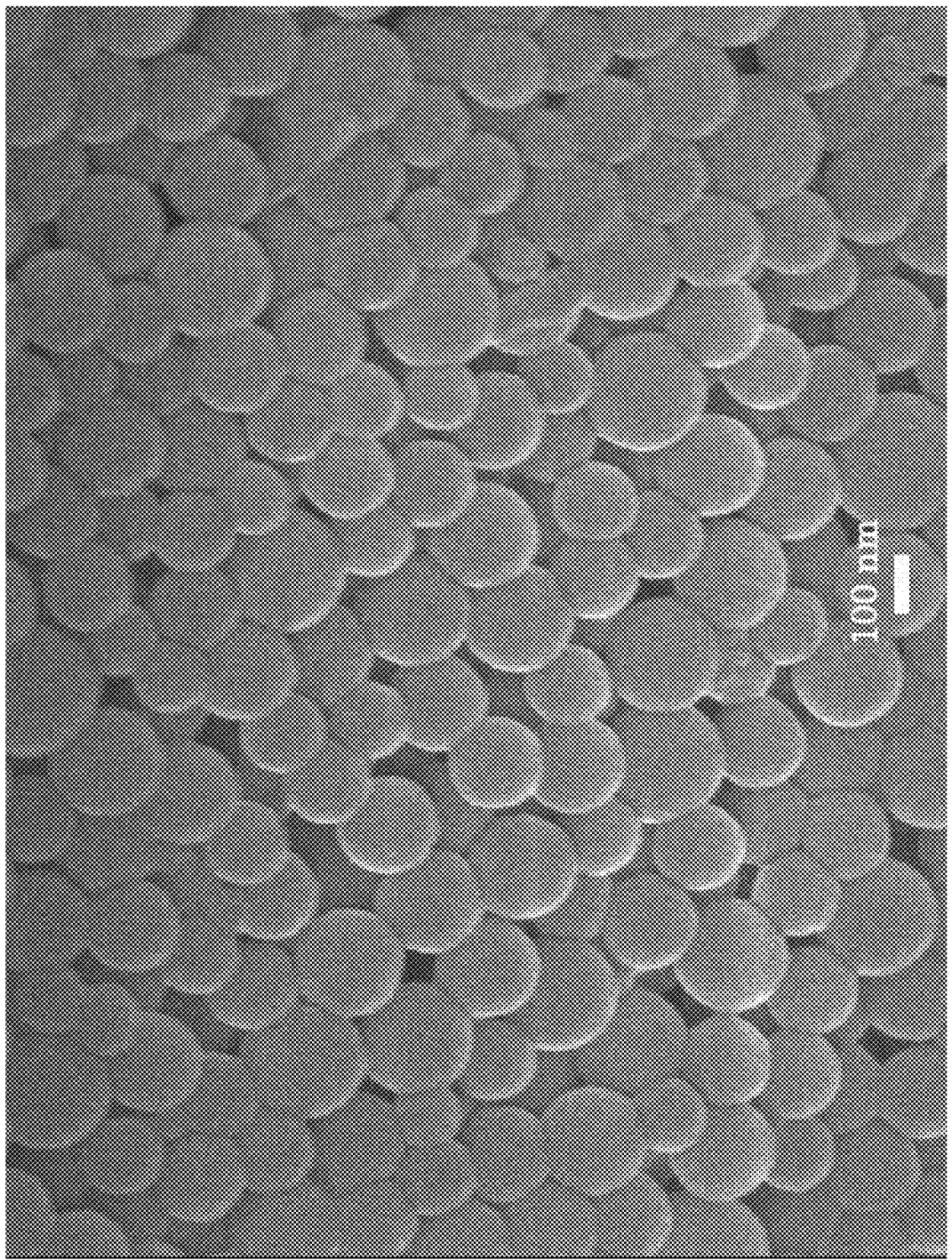
FIG. 8 is a SEM picture of acryl polymer microparticles produced in Example 20 of the present invention.

In Table 4, in Examples 16 to 20, the results are shown as to the case in which the circumferential velocity at the converging site of the first fluid and the second fluid in the first processing surface 1 was changed. In these examples, only the circumferential velocity at the converging site in the first processing surface 1 was changed, while other conditions were all the same. In FIG. 7, the SEM picture of the acryl polymer microparticles obtained in Example 16 is shown; and in FIG. 8, the SEM picture of the acryl polymer microparticles obtained in Example 20 is shown. The "Rate of coalescence of microparticles by themselves" in Table 4 means that the SEM picture with the same magnification of the acryl polymer microparticles obtained each in Examples 16 to 20 was divided into 16 areas; and if no coalescence of the acryl polymer microparticles by themselves was confirmed in all of the areas, then this was evaluated as "0%"; if coalescence of the acryl polymer microparticles by themselves was confirmed in all of the areas, then this was evaluated as "100%"; and if coalescence of the acryl polymer microparticles by themselves was confirmed in 3 areas out of 16 areas, then this was evaluated as "19%". There exist plural acryl polymer microparticles in one area, and if at least two microparticles out of them form the coalescence, then this was evaluated as confirmation of the coalescence of the acryl polymer microparticles by themselves.

From Table 4, it was confirmed that during the time when the first fluid and the second fluid were mixed in the thin film fluid, by controlling the circumferential velocity at the converging site in the first processing surface 1, the rate of coalescence of the acryl polymer microparticles by themselves could be controlled. In addition, from Table 4, it was confirmed that during the time when the first fluid and the second fluid were mixed in the thin film fluid, by controlling the circumferential velocity at the converging site in the first processing surface 1, the particle diameter of the acryl polymer microparticles could be controlled.

As to the rate of coalescence of the acryl polymer microparticles by themselves, as shown in Table 4, it was confirmed that by slowing the circumferential velocity at the converging site in the first processing surface 1, the rate of coalescence of the acryl polymer microparticles by themselves could be controlled so as to be higher, and that by accelerating the circumferential velocity at the converging site in the first processing surface 1, the rate of coalescence of the acryl polymer microparticles by themselves could be controlled so as to be lower. Especially in Examples 18 to 20, it was confirmed that the rates of coalescence of the acryl polymer microparticles by themselves were low.

Further, as to the particle diameter of the acryl polymer microparticles, as shown Table 4, it was confirmed that by slowing the circumferential velocity at the converging site in the first processing surface 1, the particle diameter of the acryl polymer microparticles could be controlled so as to be larger, and that by accelerating the circumferential velocity at the converging site in the first processing surface 1, the particle diameter of the acryl polymer microparticles could be controlled so as to be smaller. It was confirmed that in the region in which the circumferential velocity at the converging site in the first processing surface 1 was comparatively slower (Example 16 and 17), separation of the acryl polymer microparticles among themselves was poor. Also it was confirmed that in the region in which the circumferential velocity at the converging site in the first processing surface 1 was faster than Example 17 (Example 18 to 20), as shown in FIG. 4, separation state of the acryl polymer microparticles among themselves was bettered, whereby it was confirmed that the particle diameter of the acryl polymer microparticles obtained from each Example could be controlled.

Further, in Table 4, also in Examples using the dispersant, it was confirmed that by controlling the circumferential velocity at the conversing site of the first processing surface 1, the rate of coalescence of the acryl polymer microparticles by themselves could be controlled.

From the above results, also in the acryl polymer microparticles which were obtained by thermally polymerizing the acryl monomer microparticles in the dispersion solution of the acryl monomer microparticles that was discharged from between the processing surfaces 1 and 2, it was confirmed that by controlling the circumferential velocity at the converging site in the first processing surface 1, the rate of coalescence of the acryl polymer microparticles by themselves could be controlled, and also that the particle diameter of the obtained acryl polymer microparticles could be controlled.

Preparation of Amorphous Silica Microparticles:

Next, by using the fluid processing apparatus shown in FIG. 1, the fluid containing sodium silicate ($Na_2SiO_3$) (raw material fluid) was mixed with the processing fluid containing BYK-110 (manufactured by BYK Japan KK) as the dispersant in the thin film fluid formed between the pro-

TABLE 4

| Example | Circumferential velocity (m/sec) | Particle diameter (nm) | Rate of coalescence of microparticles by themselves (%) |
|---|---|---|---|
| 16 | 2.09 | 11236 | 94 |
| 17 | 6.28 | 3564 | 81 |
| 18 | 15.08 | 1287 | 38 |
| 19 | 27.90 | 234 | 13 |
| 20 | 41.00 | 155 | 0 | cessing surfaces 1 and 2 to separate microparticles of the amorphous silica in the thin film fluid.

As Examples 21 to 25, while the raw material fluid (5% by weight of aqueous $Na_2SiO_3$) as the first fluid was introduced from the center with the supply pressure of 0.200 MPaG and with the liquid temperature of 22.8° C. and the introduction rate of 200 mL/min, the processing fluid (0.5% by weight of BYK-110 in methanol solution (0.5% by weight of BYK-110 in MeOH)) with the liquid temperature of 20.0° C. was introduced as the second fluid into between the processing surfaces 1 and 2 at the introduction rate of 20 mL/minute, whereby the first fluid and the second fluid were mixed in the thin film fluid. Each of the supply temperatures of the first fluid and the second fluid was measured just before introduction of the first fluid and the second fluid into the processing apparatus (in more detail, just before introduction into between the processing surfaces 1 and 2). The dispersion solution of the amorphous silica microparticles was discharged from between the processing surfaces 1 and 2. The particle diameter of the amorphous silica microparticles in the dispersion solution of the amorphous silica microparticles that was discharged therefrom were confirmed by the TEM observation.

Figure 9:
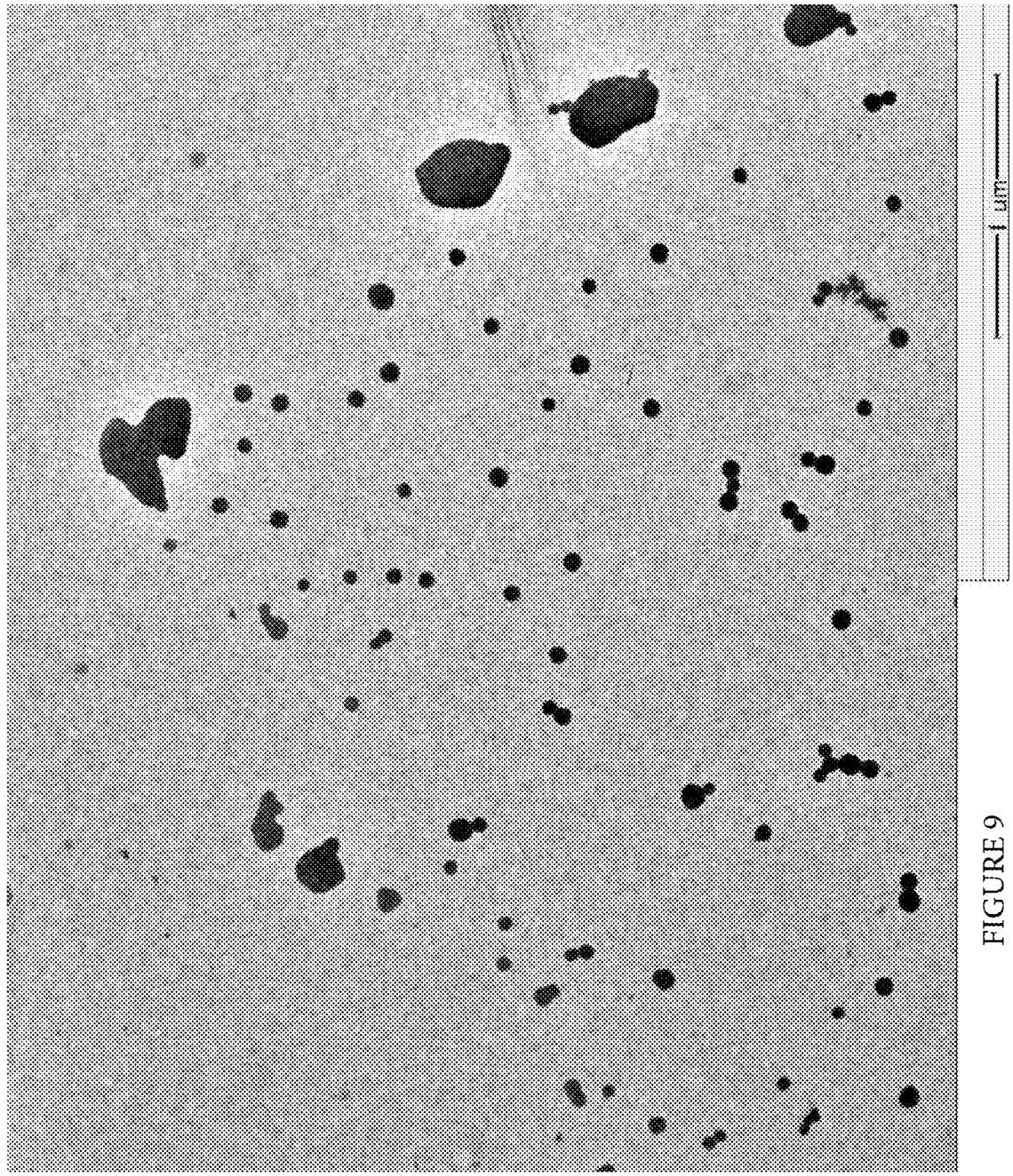
FIG. 9 is a TEM picture of amorphous silica microparticles produced in Example 23 of the present invention.
Figure 10:
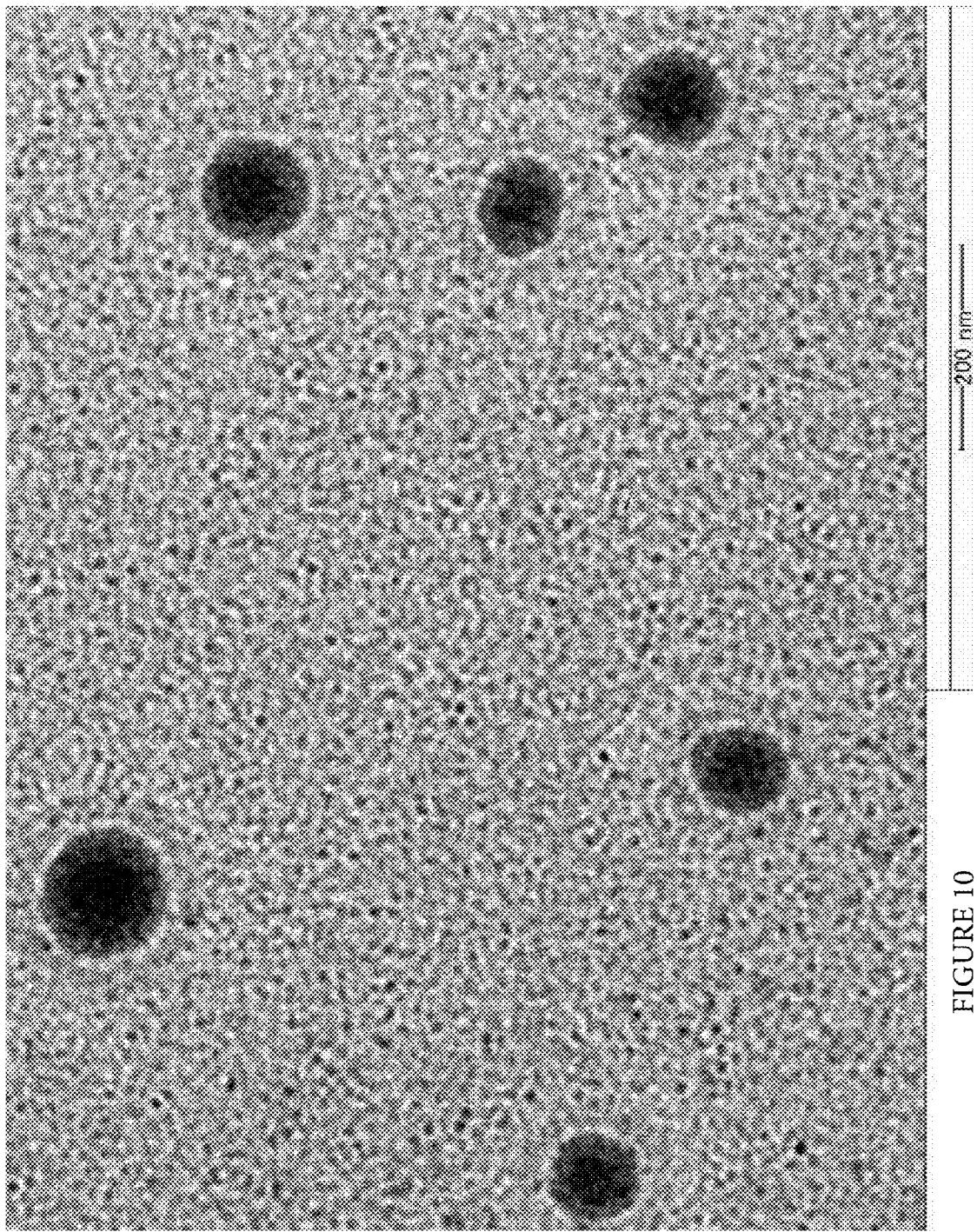
FIG. 10 is a TEM picture of amorphous silica microparticles produced in Example 24 of the present invention.

In Table 5, in Examples 21 to 25, the results are shown as to the case in which the circumferential velocity at the converging site of the first fluid and the second fluid in the first processing surface 1 was changed. In these examples, only the circumferential velocity at the converging site in the first processing surface 1 was changed, while other conditions were all the same. In FIG. 9, the TEM picture of the amorphous silica microparticles obtained in Example 23 is shown; and in FIG. 10, the TEM picture of the amorphous silica microparticles obtained in Example 24 is shown. The "Rate of coalescence of microparticles by themselves" in Table 4 means that the TEM picture of the amorphous silica microparticles obtained in Examples 21 to 25 was divided into 16 areas; and if no coalescence of the amorphous silica microparticles by themselves was confirmed in all of the areas, then this was evaluated as "0%"; if coalescence of the amorphous silica microparticles by themselves was confirmed in all of the areas, then this was evaluated as "100%"; and if coalescence of the amorphous silica microparticles by themselves was confirmed in 3 areas out of 16 areas, then this was evaluated as "19%". There exist plural amorphous silica microparticles in one area, and if at least two microparticles out of them form the coalescence, then this was evaluated as confirmation of the coalescence of the amorphous silica microparticles by themselves.

TABLE 5

| Example | Circumferential velocity (m/sec) | Particle diameter (nm) | Rate of coalescence of microparticles by themselves (%) |
| --- | --- | --- | --- |
| 21 | 1.44 | 794 | 94 |
| 22 | 3.28 | 568 | 81 |
| 23 | 6.16 | 336 | 31 |
| 24 | 12.32 | 116 | 0 |
| 25 | 14.78 | 97 | 0 |

From Table 5, it was confirmed that during the time when the first fluid and the second fluid were mixed in the thin film fluid, by controlling the circumferential velocity at the converging site in the first processing surface 1, the rate of coalescence of the amorphous silica microparticles by themselves could be controlled. In addition, from Table 5, it was confirmed that during the time when the first fluid and the second fluid were mixed in the thin film fluid, by controlling the circumferential velocity at the converging site in the first processing surface 1, the particle diameter of the amorphous silica microparticles could be controlled.

As to the rate of coalescence of the amorphous silica microparticles by themselves, as shown in Table 5, it was confirmed that by slowing the circumferential velocity at the converging site in the first processing surface 1, the rate of coalescence of the amorphous silica microparticles by themselves could be controlled so as to be higher, and that by accelerating the circumferential velocity at the converging site in the first processing surface 1, the rate of coalescence of the amorphous silica microparticles by themselves could be controlled so as to be lower. Especially in Examples 23 to 25, it was confirmed that the rates of coalescence of the amorphous silica microparticles by themselves were low.

Further, as to the particle diameter of the amorphous silica microparticles, as shown Table 5, it was confirmed that by slowing the circumferential velocity at the converging site in the first processing surface 1, the particle diameter of the amorphous silica microparticles could be controlled so as to be larger, and that by accelerating the circumferential velocity at the converging site in the first processing surface 1, the particle diameter of the amorphous silica microparticles could be controlled so as to be smaller. It was confirmed that in the region in which the circumferential velocity at the converging site in the first processing surface 1 was slow (Example 21 and 22), separation of the amorphous silica microparticles among themselves was poor. Also it was confirmed that in the region in which the circumferential velocity at the converging site in the first processing surface 1 was faster than Example 22 (Example 23 to 25), separation state of the amorphous silica microparticles among themselves was bettered, whereby it was confirmed that the particle diameter of the amorphous silica microparticles obtained from each Example could be controlled.

Further, in Table 5, also in Examples using the dispersant, it was confirmed that by controlling the circumferential velocity at the conversing site of the first processing surface 1, the rate of coalescence of the amorphous silica microparticles by themselves could be controlled.

From the above results, it was confirmed that by controlling the circumferential velocity at the converging site in the first processing surface 1, the rate of coalescence of the amorphous silica microparticles by themselves could be controlled, and also that the particle diameter of the amorphous silica microparticles could be controlled.

EXPLANATION OF REFERENCE NUMERALS 1 first processing surface
2 second processing surface
10 first processing member
11 first holder
20 second processing member
21 second holder
d1 first introduction part
d2 second introduction part
d20 opening

The invention claimed is:
1. A method for producing microparticles, in which
providing at least two fluids to be processed, including a raw material fluid which contains at least one raw material, and a processing fluid which contains at least one substance to process the raw material;
introducing the at least two fluids into a processing device, the processing device comprising at least two processing surfaces facing each other, the at least two processing surfaces being configured to approach to and separate from each other, at least one of the at least two processing surfaces rotating relative to the other;

mixing the at least two fluids in a space formed between the at least two processing surfaces, thereby forming a thin film fluid;

obtaining microparticles of the raw material processed in the thin film fluid; and adjusting a circumferential velocity of the rotation at a converging site in which the raw material fluid and the processing fluid are converged to be within a range of 6.16 to 20.94 m/sec to control a rate of coalescence of the microparticles to be 0% or more but no more than 31%, the rate of coalescence of the microparticles representing a ratio of plural microparticles that are stuck together in the obtained microparticles relative to the obtained microparticles, wherein the microparticles are the at least one kind of microparticles selected from the group consisting of nickel microparticles, copper microparticles, and amorphous silica microparticles, and wherein the processing device includes a first flow path for introducing one of the at least two fluids into the space between the at least two processing surfaces, and a second flow path, independent of the first flow path, for introducing the other of the at least two fluids, the second flow path leading to at least one opening formed on at least one of the at least two processing surfaces, said the other of the at least two fluids being introduced into the space between the at least two processing surfaces through the at least one opening, and wherein the converging point at which the at least two fluids converge together is the nearest point in the opening from a rotational center of the at least two processing surfaces.

2. The method for producing microparticles according to claim 1, wherein the processing device includes a first flow path and a second flow path that is independent of the first flow path, and at least one opening which leads to the second flow path is formed in at least one of the at least two processing surfaces, the method further comprising:

passing one of the raw material fluid and the processing fluid through the first flow path to the space between the at least two processing surfaces while forming the thin film fluid; and passing the other of the raw material fluid and the processing fluid through the second flow path to the space between the at least two processing surfaces from the at least one opening, whereby mixing the raw material fluid and the processing fluid in the thin film fluid.

3. The method for producing microparticles according to claim 1, wherein the rate of coalescence of the microparticles is controlled so as to become higher, by slowing the circumferential velocity of the rotation at the converging site in which the raw material fluid and the processing fluid are converged.

4. A method for producing microparticles, in which providing at least two fluids to be processed, including a raw material fluid which contains at least one raw material, and a processing fluid which contains at least one substance to process the raw material;

introducing the at least two fluids into a processing device, the processing device comprising at least two processing surfaces facing each other, the at least two processing surfaces being configured to approach to and separate from each other, at least one of the at least two processing surfaces rotating relative to the other;

mixing the at least two fluids in a space formed between the at least two processing surfaces, thereby forming a thin film fluid;

obtaining microparticles of the raw material processed in the thin film fluid; and adjusting a circumferential velocity of the rotation at a converging site in which the raw material fluid and the processing fluid are converged to be within a range of 15.08 to 41.00 m/sec to control a rate of coalescence of the microparticles to be 0% or more but no more than 38%, the rate of coalescence of the microparticles representing a ratio of plural microparticles that are stuck together in the obtained microparticles relative to the obtained microparticles, wherein the microparticles are acryl monomer microparticles.

5. The method for producing microparticles according to claim 4, wherein the rate of coalescence of the microparticles is controlled so as to become higher, by slowing the circumferential velocity of the rotation at the converging site in which the raw material fluid and the processing fluid are converged.

6. The method for producing microparticles according to claim 4, wherein the processing device includes a first flow path for introducing one of the at least two fluids into the space between the at least two processing surfaces, and a second flow path, independent of the first flow path, for introducing the other of the at least two fluids, the second flow path leading to at least one opening formed on at least one of the at least two processing surfaces, said the other of the at least two fluids being introduced into the space between the at least two processing surfaces through the at least one opening, and wherein the converging point at which the at least two fluids converge together is the nearest point in the opening from a rotational center of the at least two processing surfaces.

7. A method for producing microparticles, in which providing at least two fluids to be processed, including a raw material fluid which contains at least one raw material, and a processing fluid which contains at least one substance to process the raw material;

introducing the at least two fluids into a processing device, the processing device comprising at least two processing surfaces facing each other, the at least two processing surfaces being configured to approach to and separate from each other, at least one of the at least two processing surfaces rotating relative to the other;

mixing the at least two fluids in a space formed between the at least two processing surfaces, thereby forming a thin film fluid;

obtaining microparticles of the raw material processed in the thin film fluid; and adjusting a circumferential velocity of the rotation at a converging site in which the raw material fluid and the processing fluid are converged to be within a range of 1.68 to 5.03 m/sec to control a rate of coalescence of the microparticles to be 0% or more but no more than 25%, the rate of coalescence of the microparticles representing a ratio of plural microparticles that are stuck together in the obtained microparticles relative to the obtained microparticles, wherein the microparticles are silver microparticles, and wherein the processing device includes a first flow path for introducing one of the at least two fluids into the space between the at least two processing surfaces, and a second flow path, independent of the first flow path, for introducing the other of the at least two fluids, the second flow path leading to at least one opening formed on at least one of the at least two processing surfaces, said the other of the at least two fluids being introduced into the space between the at least two processing surfaces through the at least one opening, and wherein the converging point at which the at least two fluids converge together is the nearest point in the opening from a rotational center of the at least two processing surfaces.

8. The method for producing microparticles according to claim 7, wherein the rate of coalescence of the microparticles is controlled so as to become lower, by slowing the circumferential velocity of the rotation at the converging site in which the raw material fluid and the processing fluid are converged.

9. A method for producing microparticles, in which
providing at least two fluids to be processed, including a raw material fluid which contains at least one raw material, and a processing fluid which contains at least one substance to process the raw material;
introducing the at least two fluids into a processing device, the processing device comprising at least two processing surfaces facing each other, the at least two processing surfaces being configured to approach to and separate from each other, at least one of the at least two processing surfaces rotating relative to the other;
mixing the at least two fluids in a space formed between the at least two processing surfaces, thereby forming a thin film fluid;
obtaining microparticles of the raw material processed in the thin film fluid, the obtained microparticles having cases that contain microparticles which are coalesced or do not contain microparticles which are coalesced, wherein coalesced microparticles are referring to plural microparticles that are stuck together; and
adjusting a circumferential velocity of the rotation at a converging site in which the raw material fluid and the processing fluid are converged to be within a range of 6.16 to 20.94 m/sec to control a rate of coalescence of the microparticles to be commensurate with the circumferential velocity,
wherein the microparticles are the at least one kind of microparticles selected from the group consisting of nickel microparticles, copper microparticles, and amorphous silica microparticles, and
wherein the processing device includes a first flow path for introducing one of the at least two fluids into the space between the at least two processing surfaces, and a second flow path, independent of the first flow path, for introducing the other of the at least two fluids, the second flow path leading to at least one opening formed on at least one of the at least two processing surfaces, said the other of the at least two fluids being introduced into the space between the at least two processing surfaces through the at least one opening, and wherein the converging point at which the at least two fluids converge together is the nearest point in the opening from a rotational center of the at least two processing surfaces.

10. A method for producing microparticles, in which
providing at least two fluids to be processed, including a raw material fluid which contains at least one raw material, and a processing fluid which contains at least one substance to process the raw material;
introducing the at least two fluids into a processing device, the processing device comprising at least two processing surfaces facing each other, the at least two processing surfaces being configured to approach to and separate from each other, at least one of the at least two processing surfaces rotating relative to the other;
mixing the at least two fluids in a space formed between the at least two processing surfaces, thereby forming a thin film fluid;
obtaining microparticles of the raw material processed in the thin film fluid, the obtained microparticles having cases that contain microparticles which are coalesced or do not contain microparticles which are coalesced, wherein coalesced microparticles are referring to plural microparticles that are stuck together; and
adjusting a circumferential velocity of the rotation at a converging site in which the raw material fluid and the processing fluid are converged to be within a range of 15.08 to 41.00 m/sec to control a rate of coalescence of the microparticles to be commensurate with the circumferential velocity,
wherein the microparticles are acryl monomer microparticles.

11. A method for producing microparticles, in which
providing at least two fluids to be processed, including a raw material fluid which contains at least one raw material, and a processing fluid which contains at least one substance to process the raw material;
introducing the at least two fluids into a processing device, the processing device comprising at least two processing surfaces facing each other, the at least two processing surfaces being configured to approach to and separate from each other, at least one of the at least two processing surfaces rotating relative to the other;
mixing the at least two fluids in a space formed between the at least two processing surfaces, thereby forming a thin film fluid;
obtaining microparticles of the raw material processed in the thin film fluid, the obtained microparticles having cases that contain microparticles which are coalesced or do not contain microparticles which are coalesced, wherein coalesced microparticles are referring to plural microparticles that are stuck together; and
adjusting a circumferential velocity of the rotation at a converging site in which the raw material fluid and the processing fluid are converged to be within a range of 1.68 to 5.03 m/sec to control a rate of coalescence of the microparticles to be commensurate with the circumferential velocity,
wherein the microparticles are silver microparticles, and
wherein the processing device includes a first flow path for introducing one of the at least two fluids into the space between the at least two processing surfaces, and a second flow path, independent of the first flow path, for introducing the other of the at least two fluids, the second flow path leading to at least one opening formed on at least one of the at least two processing surfaces, said the other of the at least two fluids being introduced into the space between the at least two processing surfaces through the at least one opening, and wherein the converging point at which the at least two fluids converge together is the nearest point in the opening from a rotational center of the at least two processing surfaces.

* * * * *